United States Patent

Kobayashi

[11] Patent Number: 5,825,924
[45] Date of Patent: Oct. 20, 1998

[54] METHOD AND APPARATUS FOR IMAGE PROCESSING

[75] Inventor: Tetsuji Kobayashi, Yokosuka, Japan

[73] Assignee: Nippon Telegraph and Telephone Corporation, Tokyo, Japan

[21] Appl. No.: 757,960

[22] Filed: Nov. 25, 1996

Related U.S. Application Data

[63] Continuation of Ser. No. 238,855, May 6, 1994, abandoned.

[30] Foreign Application Priority Data

May 7, 1993 [JP] Japan ................................ 5-107075

[51] Int. Cl.⁶ ................................................ G06K 9/68
[52] U.S. Cl. ...................... 382/219; 382/218; 382/209; 382/125
[58] Field of Search ...................... 382/125, 126, 382/218, 219, 209

[56] References Cited

U.S. PATENT DOCUMENTS

| | | | |
|---|---|---|---|
| 4,578,765 | 3/1986 | Barker | 382/218 |
| 4,747,148 | 5/1988 | Watanabe et al. | 382/209 |
| 4,962,541 | 10/1990 | Doi et al. | 382/218 |
| 5,067,161 | 11/1991 | Mikami et al. | 382/294 |
| 5,067,162 | 11/1991 | Driscoll, Jr. et al. | 382/126 |
| 5,105,467 | 4/1992 | Kim et al. | 382/125 |
| 5,121,444 | 6/1992 | Takizawa et al. | 382/219 |
| 5,239,590 | 8/1993 | Yamamoto | 382/125 |
| 5,255,331 | 10/1993 | Kelly | 382/220 |

FOREIGN PATENT DOCUMENTS

| | | | |
|---|---|---|---|
| 0 508 845 A2 | 10/1992 | European Pat. Off. | G06K 9/80 |
| Sho 58-55548 | 7/1977 | Japan | G06K 9/00 |
| 63-132386 | 6/1988 | Japan | G06K 9/00 |
| 4-281575 | 10/1992 | Japan | G06F 15/66 |

OTHER PUBLICATIONS

European Search Report.
Kenji Kanayama et al., Development and Application of Vehicle–License Number Recognition System Using Real–Time Image Processing, Systems & Computers In Japan, vol. 22, No. 1, pp. 49–58, Jan. 1991.
R.C. Bolles, Robust Feature Matching Through Maximal Cliques, vol. 182, Proceedings Of The Society Of Photo–Optical Instrumentation Engineers, Imaging Applications For Automated Industrial Inspection And Assembly, Washington, D.C. USA, Apr. 19–20, 1979, pp. 140–149.
Wei–Chung Lin et al., "A Review of Ridgee Counting in Dermatoglyphics", 1023 Pattern Recognition, 1983, vol. 16, No. 1, pp. 1–8.

(List continued on next page.)

*Primary Examiner*—Jose L. Couso
*Assistant Examiner*—Anh Hong Do
*Attorney, Agent, or Firm*—Finnegan, Henderson, Farabow, Garrett & Dunner, L.L.P.

[57] ABSTRACT

The present invention provides an image processing apparatus and method comprising a memory for storing address information of a binary registered image. An original test image is converted into a binary test image so that the ratio of the total number of black pixels to the total number of black and white pixels lies within a predetermined range. The binary test image is aligned to the binary registered image in order to compare the two images. A degree of concordance between the binary test image and the binary registered image is determined if the comparison satisfies a predetermined condition of concordance. A degree of discordance between the binary test image and the binary registered image is determined if the comparison satisfies a predetermined condition of discordance. The binary test image is determined to originate from the same object as the binary registered image according to the degree of concordance and the degree of discordance between the two images.

10 Claims, 24 Drawing Sheets

OTHER PUBLICATIONS

Jun Ohya et al., "A Relaxational Extracting Method for Character Recognition in Scene Images", Jun. 5–8, 1988, Proceedings CVPR '88, pp. 424–429.

Shimizu et al., "Entry Method of Fingerprint Image with a Prism–Comparison between Total and Light Path Separation Method", IEICE Journal, vol. 3, pp. 414–415 (1985).

Igaki et al., "Personal Identification Terminal using a Holographic Fingerprint Sensor", IEICE Technical Report, PRU87–31, pp. 27–33 (1987).

Sasagawa et al., "Personal Verification System with High Tolerance of Poor–Quality Fingerprints," IEICE Journal, vol. J72–D–II, No. 5, pp. 707–714 (1990).

Takagi and Shimoda, "Handbook of Image Analysis", pp. 538–548, Tokyo Univ. Press (1991).

Tamura, "Introduction to Computer Image Processing", Souken Press, pp. 70, 71, 80–83 (1985).

Tamura, "Research Relating to Multi–sided Image Processing and its Software Support System," Electrotechnical Laboratory Japan Research Report, pp. 25–64, No. 835 (Feb. 1984).

Mori et al., "Fundamentals of Image Recognition [I]", pp. 37–47, 71–75, Ohm Corporation (1986).

Kobayashi et al., "A Thinning Method for Extracting Characteristic Points of an Image," Institutes of Electronics, IEICE Technical Report, PRU90–149, pp. 33–38 (1991).

Plastock et al., "Theory and Problems of Computer Graphics", pp. 84–89, McGraw Hill Books (1987).

Ito et al., "An Algorithm for Classification of Finger Prints based on the Core", IEICE Technical Report, PRU 89–79, pp. 15–22 (1989).

Sakurada et al., "In Extraction Technique of the Pivot Location for Automated Fingerprint Identification Process," IEICE National Conference on Information and Systems, No. 125 (1987).

Kobayashi, "A Template Matching Scheme for Fingerprint Image Recognition", IEICE Technical Report, PRU 91–45, pp. 25–30, Jul. 1991.

|  $P_4$ | $P_3$ | $P_2$ |
|---|---|---|
| $P_5$ | $P_0$ | $P_1$ |
| $P_6$ | $P_7$ | $P_8$ |

FIG. 3A

| $P_{15}$ | $P_{14}$ | $P_{13}$ | $P_{12}$ |
|---|---|---|---|
| $P_{11}$ | $P_{10}$ | $P_9$ | $P_8$ |
| $P_7$ | $P_6$ | $P_5$ | $P_4$ |
| $P_3$ | $P_2$ | $P_1$ | $P_0$ |

FIG. 3B

| $P_{11}$ | $P_{10}$ | $P_9$ | $P_8$ |
|---|---|---|---|
| $P_7$ | $P_6$ | $P_5$ | $P_4$ |
| $P_3$ | $P_2$ | $P_1$ | $P_0$ |

FIG. 3C

| N \ M | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 1 | 1 | 1 | 1 | 1 | 0 | 0 | 0 | 0 | 0 | 0 |
| 2 | 0 | 0 | 0 | 1 | 1 | 1 | 1 | 1 | 1 | 1 | 1 | 1 | 1 | 0 | 0 | 0 |
| 3 | 0 | 0 | 0 | 1 | 1 | 1 | 1 | 1 | 1 | 1 | 1 | 1 | 1 | 1 | 0 | 0 |
| 4 | 0 | 0 | 1 | 1 | 1 | 1 | 1 | 1 | 1 | 1 | 1 | 1 | 1 | 1 | 0 | 0 |
| 5 | 0 | 0 | 1 | 1 | 1 | 1 | 1 | 1 | 1 | 1 | 1 | 1 | 1 | 1 | 1 | 0 |
| 6 | 0 | 1 | 1 | 1 | 1 | 1 | 1 | 1 | 1 | 1 | 1 | 1 | 1 | 1 | 1 | 0 |
| 7 | 0 | 1 | 1 | 1 | 1 | 1 | 1 | 1 | 1 | 1 | 1 | 1 | 1 | 1 | 1 | 0 |
| 8 | 0 | 0 | 1 | 1 | 1 | 1 | 1 | 1 | 1 | 1 | 1 | 1 | 1 | 1 | 1 | 0 |
| 9 | 0 | 0 | 1 | 1 | 1 | 1 | 1 | 1 | 1 | 1 | 1 | 1 | 1 | 1 | 0 | 0 |
| 10 | 0 | 0 | 0 | 1 | 1 | 1 | 1 | 1 | 1 | 1 | 1 | 1 | 1 | 1 | 0 | 0 |
| 11 | 0 | 0 | 0 | 1 | 1 | 1 | 1 | 1 | 1 | 1 | 1 | 1 | 1 | 1 | 0 | 0 |
| 12 | 0 | 0 | 0 | 1 | 1 | 1 | 1 | 1 | 1 | 1 | 1 | 1 | 1 | 0 | 0 | 0 |
| 13 | 0 | 0 | 0 | 0 | 1 | 1 | 1 | 1 | 1 | 1 | 1 | 0 | 0 | 0 | 0 | 0 |
| 14 | 0 | 0 | 0 | 0 | 0 | 0 | 1 | 1 | 1 | 1 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 |

FIG. 10

| $P_{15}$ B | $P_{14}$ B | $P_{13}$ B | $P_{12}$ B | $P_{11}$ B |
|---|---|---|---|---|
| $P_{16}$ B | $P_4$ B | $P_3$ W | $P_2$ W | $P_{10}$ B |
| $P_{17}$ B | $P_5$ W | $P_0$ W | $P_1$ W | $P_9$ B |
| $P_{18}$ B | $P_6$ W | $P_7$ W | $P_8$ W | $P_{24}$ B |
| $P_{19}$ B | $P_{20}$ B | $P_{21}$ B | $P_{22}$ B | $P_{23}$ B |

FIG. 11A

| $P_{15}$ W | $P_{14}$ W | $P_{13}$ W | $P_{12}$ W | $P_{11}$ W |
|---|---|---|---|---|
| $P_{16}$ W | $P_4$ B | $P_3$ B | $P_2$ B | $P_{10}$ W |
| $P_{17}$ W | $P_5$ B | $P_0$ B | $P_1$ B | $P_9$ W |
| $P_{18}$ W | $P_6$ W | $P_7$ B | $P_8$ B | $P_{24}$ W |
| $P_{19}$ W | $P_{20}$ W | $P_{21}$ W | $P_{22}$ W | $P_{23}$ W |

NOTE: B=BLACK PIXEL
W=WHITE PIXEL

FIG. 11B

|     | X=0 | 1 | 2 | 3 | 4 | 5 | 6 | 7 | 8 | 9 | 10 | 11 | ... |
|-----|-----|---|---|---|---|---|---|---|---|---|----|----|-----|
| Y=0 | W | W | W | W | W | W | W | W | B | W | W | W | |
| Y=1 | W | B | W | W | W | W | W | W | B | W | W | W | |
| Y=2 | W | B | W | W | W | W | W | W | W | B | W | W | |
| Y=3 | W | W | B | W | W | W | W | W | W | B | W | W | |
| Y=4 | W | W | W | B | W | B | W | W | W | W | B | W | |
| Y=5 | W | W | B | W | B | W | W | W | W | W | B | W | |
| Y=6 | W | B | W | W | B | W | W | W | W | B | W | W | |
| Y=7 | W | W | B | W | W | B | W | W | W | B | W | W | |

NOTE: B=BLACK PIXEL, W=WHITE PIXEL

FIG. 12A

| $P_{15}$ | $P_{14}$ | $P_{13}$ | $P_{12}$ |
|----------|----------|----------|----------|
| $P_{11}$ | $P_{10}$ | $P_9$ | $P_8$ |
| $P_7$ | $P_6$ | $P_5$ | $P_4$ |
| $P_3$ | $P_2$ | $P_1$ | $P_0$ |

FIG. 12B

| $P_{15}$ | $P_{14}$ | $P_{13}$ | $P_{12}$ |
|----------|----------|----------|----------|
| $P_{11}$ | $P_{10}$ | $P_9$ | $P_8$ |
| $P_7$ | $P_6$ | $P_5$ | $P_4$ |
| $P_3$ | $P_2$ | $P_1$ | $P_0$ |

FIG. 12C

| $P_{15}$ | $P_{14}$ | $P_{13}$ | $P_{12}$ |
|----------|----------|----------|----------|
| $P_{11}$ | $P_{10}$ | $P_9$ | $P_8$ |
| $P_7$ | $P_6$ | $P_5$ | $P_4$ |
| $P_3$ | $P_2$ | $P_1$ | $P_0$ |

Modified Image of Registered Fingerprint

| | | | | |
|---|---|---|---|---|
| WHITE PIXEL | WHITE PIXEL | WHITE PIXEL | BLACK PIXEL b (B) | BLACK PIXEL c (C) |
| WHITE PIXEL | BLACK PIXEL a (A) | WHITE PIXEL | WHITE PIXEL | WHITE PIXEL |
| WHITE PIXEL | WHITE PIXEL | WHITE PIXEL | WHITE PIXEL | WHITE PIXEL |

Modified Image of Test Fingerprint

| | | | | |
|---|---|---|---|---|
| WHITE PIXEL | WHITE PIXEL | BLACK PIXEL e (E) | WHITE PIXEL | WHITE PIXEL |
| WHITE PIXEL | BLACK PIXEL d (A) | WHITE PIXEL | WHITE PIXEL | |
| WHITE PIXEL | WHITE PIXEL | WHITE PIXEL | WHITE PIXEL | |

METHOD AND APPARATUS FOR IMAGE PROCESSING

This application is a continuation of application Ser. No. 08/238,855, filed May 6, 1994, now abandoned.

BACKGROUND OF THE INVENTION

The present invention relates to image processing method and apparatus, for improving the properties (e.g., improving the comparison precision, reducing the processing amount, decreasing the amount of data, etc.) in the case when conducting image processing for analyzing or recognizing a digitalized image (e.g., fingerprints, stamped images, diagrams, characters, etc.) using an image processing apparatus (i.e., hardware/software in a computer, electronic switching machine, communication control unit, IC card, image recognition device, image comparing device, image testing unit, or the like).

RELATED ART

In the following, an example of the case in which the objective image according to the present invention is a fingerprint will be explained. Essentially, a fingerprint is the crest pattern of the ridges of a finger. Furthermore, since the trough lines (the space in between the ridge lines) are defined by the ridge lines, it is possible to use a pattern formed by trough lines in place of the ridge lines as a fingerprint. For the sake of convenience, the lines defining the fingerprint will be called "fingerprint lines". Various fingerprint input devices exist for confirming an individual's identity, such as a method for inputting a fingerprint from an image pick-up unit (e.g., CCD (Charged Coupled Device)) camera, a prism method (e.g., see Shimizu et al., "Entry Method of Fingerprint Image with a Prism—Comparison between Total and Light Path Separation Method", IECE Journal, vol. J68-D, No. 3, pp. 414–415 (1985)), and a hologram method (e.g., see Igaki, et al., "Personal Identification Terminal Using a Holographic Fingerprint Sensor", Institute of Electronics and Communication Engineers of Japan (IEICE Technical Report, PRU87-31, pp. 27–33, (1987)).

The fingerprint image of analog information inputted from an image pick-up unit is converted into a gray-scale image of a digitalized fingerprint by means of an analog/digital (A/D) converter. The gray-scale image of this fingerprint is represented by the coordinates (X, Y) which are an image memory pixel address, as well as by means of the brightness of the pixels which form the structural components of each image memory pixel address. The designation method for the X and Y axes is optional and may be freely selected. The fingerprint image may be formed by converting the concavities and convexities of the fingerprint directly into a binary image.

Corrections can then be conducted on the gray-scale image of the fingerprint by means of leveling and utilizing the orientation of the ridges. End points, branch points, and points of intersection represent characteristic points which display the distinctive features of a fingerprint. The characteristic points of a gray-scale image of a digitalized fingerprint can be detected by means of conducting binary conversion of a fingerprint image and further thinning this image and examining whether or not a pattern identical to the pattern of a range of pixels (e.g., a 3×3 pixel aggregation with the characteristic point as the center) representing the characteristic point (e.g., see Sasagawa, et al., "Personal Verification System with High Tolerance of Poor-Quality Fingerprints", IEICE Journal, vol. J72-D-II No. 5, pp. 707–714 (1990)) exists. In the comparison of fingerprints, fingerprints for which information has been previously recorded in memory are referred to as "registered fingerprints" (i.e., registered images or registered fingerprint images), and the fingerprint which is compared for concordance with the aforementioned registered fingerprints are referred to as "test fingerprints" (i.e., test images or test fingerprint images). As methods for comparing the registered fingerprints and the examined fingerprints, a method utilizing characteristic points, a method utilizing the orientation of the ridge lines, and a method for matching the patterns of the original images of the examined fingerprint and the registered fingerprint are known. Japanese Patent Application, First Publication, No. Sho 63-132386 discloses a method for comparing fingerprint images, in which the thinned image of an examined fingerprint and a thinned image of the registered fingerprint are superimposed as a method for pattern matching for thinned images (see Kubota, et al., "Fingerprint Comparing Method").

Smoothing is a process for reducing the effects of noise of the fingerprint image; e.g., a local summation averaging filter which utilizes the values of neighboring pixels surrounding a random pixel (Takagi and Shimoda (Eds.), "Handbook of Image Analysis", pp. 538–548, Tokyo University Press (1991)).

With regard to the thinning process of a binary image, various pixels corresponding to lines exist, such that the majority (in this case, "majority" means at least one-half, and ideally, the entire portion) of the line widths represent 1 pixel. The various kinds of corresponding pixels are either black or white; in the following, an explanation will be given with regard to the black pixels. Hilditch's thinning method, in which the outer black pixels of a black pixel aggregation are sequentially deleted while maintaining the continuity between black pixels, is known as a method for thinning a binary image following binary conversion of the gray-scale image (4-neighbor connected or 8-neighbor connected). In addition, other methods for thinning a gray-scale image or a binary image are also known; e.g., Tamura (Ed.), "Introduction to Computer Image Processing", Sougen Press, pp. 80–83 (1985); Tamura, "Research Relating to Multi-sided Image Processing and its Software", Electrotechnical Laboratory Japan Research Report, pp. 25–64, No. 835 (February 1984); and Mori, et al., "Fundamentals of Image Recognition [I]", pp. 75–71, Ohm Corporation (1986). Japanese Patent Application No. Hei 3-45136 (1991), "A Thinning Method for Extracting Characteristic Points of an Image," (Kobayashi, et al., Institute of Electronics, Information and Communication Engineers of Japan [IEICE] Technical Report, PRU90-149, pp. 33–38 (1991)) discloses a method for thinning a gray-scale image or a, binary image. As for connectivity between black pixels, either 4-neighbor connected or 8-neighbor connected is used. 4-neighbor connected and 8-neighbor connected are also called 4-connected and 8-connected, respectively (e.g., see "Introduction to Computer Image Processing", Tamura (Ed.), Soken-Suppan, pp. 70, (1985)).

A method for binary converting a gray-scale image into a binary image is disclosed in Mori, et al., ("Fundamentals of Image Recognition [I]", pp. 37–47, Ohm Corporation (1986)). A p-tile method is known as a method for binary conversion, in which a binary conversion threshold value is determined such that the proportion of black pixels among all of the pixels in question following binary conversion (i.e., black or white pixels) reaches a predetermined value (e.g., Takagi and Shimoda (Eds.), "Handbook of Image Analysis", p. 503, Tokyo University Press (1991)). However, this process cannot be directly applied to the case when binary conversion is carried out by means of dividing the image into partial regions.

With regard to the input of fingerprints, positional errors (rotational and parallel displacements) occur when comparing a test fingerprint with a registered fingerprint, and hence when carrying out comparison, it is necessary to align these two fingerprints. As methods for aligning the aforementioned fingerprints (rotational and parallel displacements), a method which utilizes the ridge orientation, a method which utilizes representative characteristic points and peripheral characteristic points, and a method which applies trial and error practice over a range in which only parallel displacement is possible to produce a final position of maximum concordance, are known. Furthermore, at the time of aligning, a conventional method for performing the required coordinate and geometric transformations is disclosed in Plastock, et al., ("Theory and Problems of Computer Graphics", translated by Koriyama), pp. 84–88, McGraw Hill Books (1987)).

In the aligning at the time of comparison, it is useful to calculate the approximate center point of a fingerprint image. A method for calculating the approximate center point by means of successively examining ridges with sharp increases in their gradients is disclosed in Japanese Patent Application, Second Publication, No. Sho 58-55548 ("A Method for Determining the Center Position of a Diagram"). In Ito, et al., ("An Algorithm for Classification of Fingerprints Based on the Core", IEICE Technical Report, PRU89-79, pp. 15–22 (1989)). A method for successively accessing a center position using the number of intersections of parallel lines of each rectangular region is disclosed. In addition, in "An Extraction Technique of the Pirot Location for Automated Fingerprint Identification Process" (IEICE National Conference on Information and Systems, No. 125 (1987), a method is disclosed for calculating the distribution of the number of lines present by counting the number of ridge lines passing through each scanning line.

Kobayashi ("A Template Matching Scheme for Fingerprint Image Recognition", IEICE Technical Report, PRU91-45, pp. 25–30, July 1991)) discloses a method for comparing black pixels extracted from a thinned image (or narrowed image) of a registered fingerprint and the binary image (or narrowed image) of a test fingerprint wherein the processing amount and memory capacity have been decreased to a greater degree than in the process for comparing two binary images.

In consideration of the conservation of memory for registered information, it is necessary to decrease the memory quantity as much as possible. In the present invention, it is necessary to record the narrow processed binary image (line figures) as registered information. As a method for storing line figures, a method is known which uses Freeman chain codes (e.g., Yasui and Nakajima, "Image Information Processing", pp. 113–114, Morikita Publishing (1991)); however, the application of this method to complex images, as in the case of a fingerprint, is extremely difficult.

Conventionally, methods such as reversion of the fingerprint lines, thinning, and comparison alignment, for example, represent procedures with a large processing amount, at the time of comparison of the fingerprint image. In addition, in the comparison method which utilizes characteristic points (end points, branch points, points of intersection) of the image, due to reversion of the fingerprint lines, the processing amount is large, and in addition, comparison is difficult in the case when the characteristic points are unclear or indistinct, and when the number of these characteristic points is small. In the comparison process which utilizes pattern matching of the original images of a registered fingerprint and a test fingerprint, at the time of sealing, the width of the ridge lines of the fingerprint are altered due to factors such as the pressure of the finger, existence of a dry state, and the like, and hence, errors are easily generated and a large memory capacity is necessary to store the registered information.

SUMMARY OF THE INVENTION

It is an objective of the present invention to provide an image processing method and apparatus comprising one or more means for improving the comparison properties of a fingerprint or similar image. In an embodiment of the comparing method and apparatus according to the present invention, the information (the address group of black pixels extracted from a specified range of the image) extracted from a binary image produced by binary converting, and thinning or narrowing a registered image, and the binary image of a test image are aligned and the concordance of their black pixels are checked to judge whether or not a positive identification (i.e., whether or not an individual's identity can be confirmed) can be made. In the following, an outline of the essential components of the image processing apparatus and method for the same according to the present invention will be explained.

Increasing the comparison precision in order to improve the image processing properties is accomplished by means of selectively utilizing a means for judging whether the concordance or discordance degree meets specified conditions when the ratio of the total number of black pixels to the total pixels falls within a specified range; a means for checking the presence and position of a hole generated by a white pixel aggregation within a black pixel aggregation; a means for examining neighboring pixels when comparing binary converted images; and a means for registering the optimum image obtained from reciprocal comparison of one or more images.

Increasing the quality of the image in order to improve the image processing properties is accomplished by means of selectively utilizing a means for performing binary conversion using a threshold value which is obtained by means of calculating the average brightness for each partial region is calculated, and converting the average brightness values in reciprocal intervals of the partial regions; a means for performing binary conversion of portions in which little variation of the brightness occurs; and a means for repeatedly performing binary conversion in order to keep the ratio of the total number of black pixels to the total number of black and white pixels within a fixed range.

Decreasing the processing amount for comparison in order to improve the image processing properties is accomplished by means of selectively utilizing a means for sequentially judging the degree of concordance at each partial alignment interval such that in the case when image concordance is detected, the comparison process is not conducted for partial alignment intervals following the partial alignment interval in which concordance was detected; and a means for comparing m number of partial alignment intervals (m≧1, and is a predetermined constant), and for determining discordance when the maximum degree of concordance over these intervals is less than a specified value.

In the case when calculation of the degree of discordance during the comparison process is undesirable, improvement of the image processing properties is achieved by selectively utilizing a means for using information of a reversed image as reversed registered information and then comparing the registered information of this reversed registered image, and a reversed test image.

BRIEF DESCRIPTION OF THE DRAWINGS

FIG. 3A shows an example of a 3×3 pixel aggregation.

FIG. 3B shows an example of a 4×4 pixel aggregation.

FIG. 3C shows an example of a 4×3 pixel aggregation.

FIG. 10 is an example of a table of a valid partial portion of a fingerprint.

FIGS. 11A and 11B are diagrams for use in explaining a hole (white pixel aggregation) and a non-hole, respectively FIGS. 12A, 12B, 12C, and 12D are diagrams for use in explaining the change from a memory format to a compression format of a binary image.

FIG. 16A is a diagram illustrating an example of the neighboring pixel search in the comparison process.

DETAILED DESCRIPTION OF THE PREFERRED EMBODIMENTS

Figure 1:
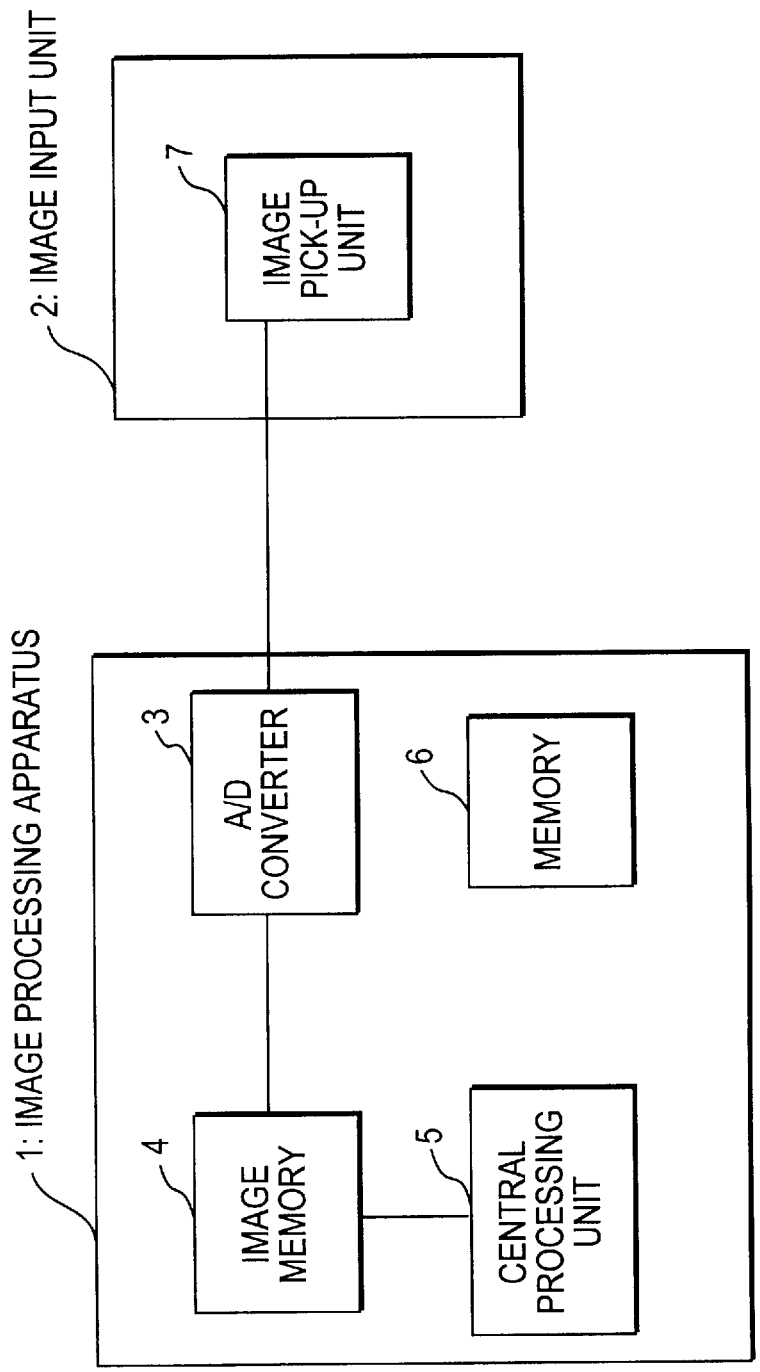
FIG. 1 shows a structural example of a fingerprint recognition system according to an embodiment of the present invention.

In the embodiments of the present invention, the case in which a fingerprint (also referred to hereafter as "fingerprint image") is used as the image is presented. FIG. 1 shows a structural example of a fingerprint identification system. The fingerprint input from image input unit 2 is processed in image processing unit 1. Image processing unit 1 comprises image memory 4 for storing a gray-scale image, a binary image, and various processed images of the digitalized fingerprint; central processing unit 5 formed from at least one CPU; and memory 6 for recording information such as programs, data, data collections, and the like. In the case when a special recording unit is included in memory 6 (e.g., semi-conductor memory, magnetic disc or the like), during mutual intervals, the movement of information is performed when necessary by means of hardware and/or software.

Image memory 4 and memory 6 are classified according to the stored information, however, it is also possible to incorporate both of these memories into the same recording unit. Image input unit 2 comprises an image pick-up unit 7. A/D converter 3 converts analog information into digital information (in the case when various image input units which can directly receive digital image are used, an A/D converter is unnecessary). The pixel address in image memory 4 for storing fingerprint images (gray-scale images of digitalized fingerprints) is represented by means of X and Y coordinates (X,Y). Pixel address (X,Y) may be indicated by "pixel (X,Y)" or simply "(X,Y)". The portion of image memory 4 storing a single image is referred to as "image plane". Image memory 4 may hold at least one image plane. In addition, pixel address may also be referred to as simply "address".

Each image plane in image memory 4 is constructed of image pixels, and when the domains of all of the pixel addresses are set to $0 \leq X \leq Xh$ and $0 \leq Y \leq Yh$, the processing domain specified in the domain these pixel addresses is processed. In the case when a number with a decimal is generated for the pixel address or the number of pixels by means of calculating the sum of the pixel addresses and the number of pixels, processing is performed by rounding of these numbers (i.e., 4 or less, round down; 5 or greater, round up to nearest integer). The value of a pixel is expressed by its brightness. The portion of the brightness defining a ridge depends upon the processing of an image in image processing unit 1, and upon the processing method of image input unit 2. In both cases, processing is possible by means of presetting brightness characteristics corresponding to ridges into image processing unit 1.

An aggregation of one or more pixels is referred to as "pixel aggregation". In fingerprint recognition, the fingerprint which is inputted from image input unit 2 for entry into memory 6 of image processing unit 1 is referred to as "registered fingerprint", and the fingerprint which is inputted from image input unit 2 for testing is referred to as "test fingerprint". In an image which has been binary converted into black and white pixels, either the black pixels or the white pixels may be selected as the objective pixel corresponding to the ridge lines or trough lines of a fingerprint. In embodiments of the present invention, the fingerprint lines will be comprised of black pixels.

Thinning is a process in which the majority portion of a line width is set to equal one pixel. However, in the embodiments of the present invention, the partial or entire narrowing of the line widths of a black pixel aggregation so that they are included in an image formed by means of the black pixels of an original binary image will be referred to as "narrowing process". Accordingly, an image obtained as a result of this narrowing process will be referred to as "narrowed image". In the embodiments of the present invention, thinning is one type of narrowing process. Furthermore, a line width is defined as the shortest distance (number of pixels) required to travel from a random point on the margin of one line to the opposite margin of the same line, passing through the inner portion of the line. Hence, a line width can be set for each margin position of a line.

Figure 2A:
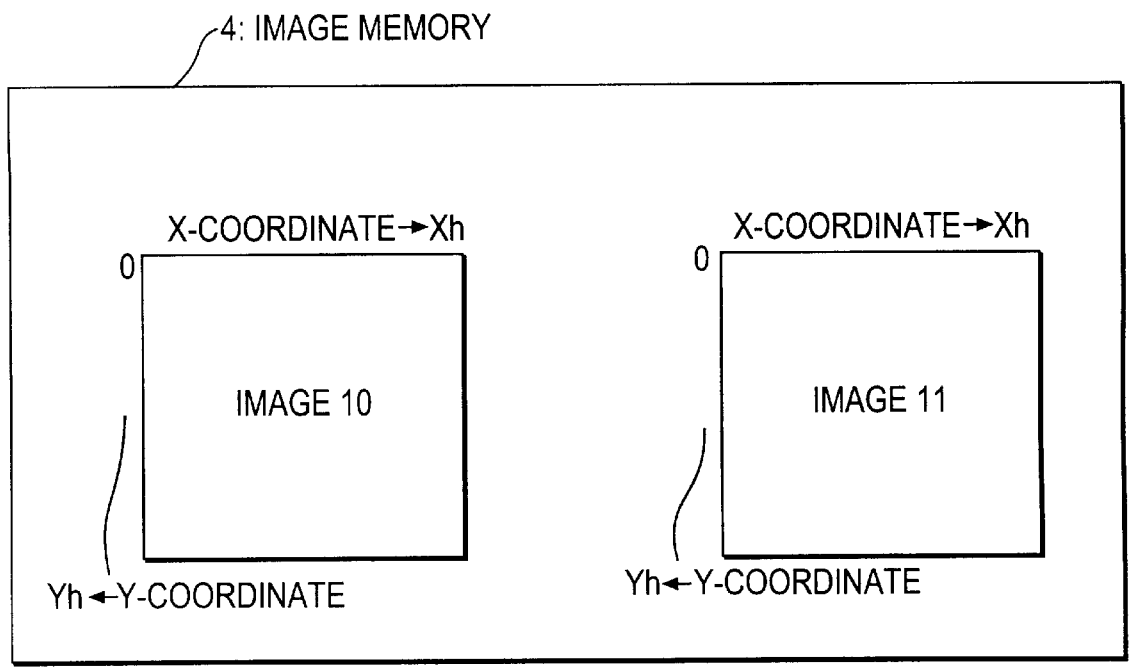
FIG. 2A is a diagram illustrating an arrangement of the image memory of FIG. 1.
Figure 2B:
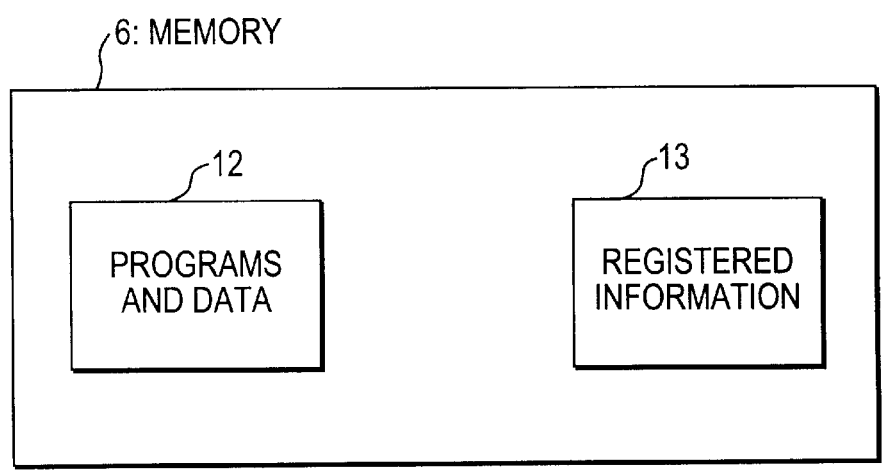
FIG. 2B is a diagram illustrating an arrangement of the memory of FIG. 1.

FIG. 2A shows the state of the image data stored in image memory 4. Digitalized images (binary images or gray-scale images) obtained from the image inputted from image input unit 2 are stored in the image planes of image 10. In the image planes of image 11, for example, images at the time of input are stored, and can be utilized in the processing of image 10. Depending on the selection of the processing procedure, image 11 may be unnecessary (in this case, it is possible for memory 4 to utilize only image 10). It is also possible to conduct image processing using memory 6 by transferring an image from image memory 4 to memory 6. FIG. 2B shows the state of data stored in memory 6. Program and data 12 store the programs and data for use in achieving the embodiments of the present invention, while registered information 13 places and maintains the registered information of a registered fingerprint image in a file.

With regard to the pixels of an image, a value corresponding to the brightness therein is defined. The brightness of a pixel address (X,Y) is indicated by f (X,Y). Depending on the method of image input, a gray-scale image designated by image memory 4 may be produced by means of binary conversion, or a binary image may be directly designated by image memory 4. A gray-scale images is an image in which various brightness values exists; this variable region of brightness can be applied to random gray-scale images as an objective of the present invention. However, for sake of convenience, in the embodiments of the present invention, in the case when numerical values are mentioned, the brightness will vary between 0 and 255, with 0 representing the lowest brightness level (black), and 255 representing the highest brightness level (white). Intermediate values therein represent successive values of the brightness between black and white.

A binary image is expressed by means of black pixels and white pixels only, and the values corresponding to the brightness of these respective black and white pixels are defined. The selection of black pixels to represent sections of a high brightness or sections of a low brightness is determined by the desired image and method of input; in the embodiments of the present invention, either case is possible. In the following, in the case when consideration must be given to values of brightness (e.g., in the case when stating values relating to the brightness), with regard to binary images, the brightness of a black pixel is 0, and the brightness of a white pixel is 255.

The theoretical origin and coordinate axes of an image stored in image memory 4 may be independently defined as the position of a pixel of a physical image memory 4. The X and Y axes may be randomly designated, however, for the sake of convenience, the X-axis possesses a horizontal orientation from left to right (i.e., in the direction of increasing value X), and the Y-axis possesses a vertical orientation from top to bottom (i.e., in the direction of increasing value Y).

An aggregation of at least one pixel is referred to as "pixel aggregation". FIG. 3 (a) is a pixel aggregation formed from pixels arranged in 3×3 pixels (i.e., 3 pixels×3 pixels); FIG. 3 (b) is a pixel aggregation formed from pixels arranged in 4×4 pixels; and FIG. 3C is a pixel aggregation formed from pixels arranged in 4×3 pixels. In FIG. 3A, pixels $\{P_1, P_3, P_5, P_7\}$ represent the 4-neighbor connected pixels of $P_0$; pixels $\{P_1, P_2, P_3, P_4, P_5, P_6, P_7, P_8\}$ represent the 8-neighbor connected pixels of $P_0$.

In the embodiments of the present invention, division is performed only when the denominator is not zero.

Notations and definitions used hereafter will be defined below. Some of these notations, however, may not appear in the embodiments.

[m]: Indicates the rounding down of an optional number m.

∥: Indicates a connection of two numbers of the values shown (e.g. 1∥0∥1=101).

~: Indicates the range between two numbers (e.g., a~b indicates the range between a and b which includes both a and b).

f (X,Y): Indicates the brightness of pixel address (X,Y).

FA: Fingerprint region; the area inside of this fingerprint region is considered the fingerprint boundary.

$(X_c, Y_c)$: Address of the approximate center point of a fingerprint.

$(X_{RC}, Y_{RC})$: Address of the approximate center point of a registered fingerprint.

$(X_{TC}, Y_{TC})$: Address of the approximate center point of a test fingerprint.

Rth: Modified image of a registered fingerprint produced by performing at least the narrowing process on the binary image (first image) of a registered fingerprint obtained from a registered fingerprint image (gray-scale image or binary image).

Tth: Modified image of a test fingerprint produced by means of adjusting the ratio of the black pixels and/or performing a narrowing process on the binary image (second image) of a test fingerprint obtained from a test fingerprint image (gray-scale image or binary image).

RA: Aggregation of all address (X,Y) of black pixels within the fingerprint region of the modified image Rth of a registered fingerprint; RA is the sum aggregation of RT(0), RB(0), and black pixels within the unused portion of a fingerprint region.

RT(0): RT(0) is a partial aggregation of RA; RT(0) may designate a sub-region of RA in which at least one randomly separated regions of the pixel aggregation exist; RT(0) is referred to as "sub-template"; the portion of an image which extracts the sub-template is often referred to as "sub-template portion"; the sub-template is used in the aligning of images (see FIGS. 4A–4C).

RB(0): RB(0) is a partial aggregation of RA which may designate a sub-region of RA one or more randomly separated regions of the pixel aggregation; RB(0) is referred to as "non-sub-template"; the portion of an image which extracts the non-sub-template is often referred to as "non-sub-template portion"; the sub-template is not used in the aligning of images. RT(0) and RB(0) are designated such that they do not overlap (see FIGS. 4A–4C).

RT(S): The aggregation of black pixel addresses (X,Y) of sub-template RT(0) at the time when the coordinate axes of the modified image of the registered fingerprint is rotated S degrees (S°) around a randomly defined center point.

RT(S,H,V): The aggregation of addresses of sub-template RT(0) in the coordinate axes following S° rotation of the coordinate axes of the modified image of the registered fingerprint around a randomly defined center point (e.g., the approximate center point of a registered fingerprint), as well as, after conducting horizontal displacement H and vertical displacement V; RT(0, 0, 0)=RT(0) and RT(S, 0, 0)=RT(S); (further, one pattern which is displaced by means of coordinate conversion of the modified image of a registered fingerprint is defined by means of the values of set {S, H, V} which designates a displacement position.).

RB(S,H,V): The aggregation of addresses of non-sub-template RB(0) in the coordinate axes following S° rotation of the coordinate axes of the modified image of the registered fingerprint around a randomly defined center point (e.g., the approximate center point of a registered fingerprint), as well as, after conducting horizontal displacement H and vertical displacement V; RB(0, 0, 0)=RB(0) and RB(S, 0, 0)=RB(S).

N1m: The number of concordant black pixels of the sub-template; indicates the number of concordant black pixels between the sub-template of the modified image of the registered fingerprint and the modified image of the test fingerprint.

N1c: The total number of black pixels of the sub-template; indicates the total number of black pixels in the sub-template of the modified image of the registered fingerprint.

N2m: The number of concordant black pixels of the non-sub-template; indicates the number of concordant black pixels between the non-sub-template of the modified image of the registered fingerprint and the modified image of the test fingerprint.

N2c: The total number of black pixels of the non-sub-template; indicates the total number of black pixels in the non-sub-template of the modified image of the registered fingerprint.

Nm: Indicates N1m or N2m; Counter Nm is the value of the counter in the calculation of Nm.

Nc: Indicates N1c or N2c; Counter Nc is the value of the counter in the calculation of Nc.

Partial region: The individual regions which result from the division of an image into a plurality of parts.

Interval [a, b]: Indicates the interval between two optional values, a and b, which includes both a and b.

Alignment interval: Indicates the range over which an image is displaced in order to align two images (group of displacement intervals for each direction), and is constructed from {rotational displacement interval, horizontal displacement interval, vertical displacement interval}.

Partial alignment interval: The individual alignment intervals resulting from division of an alignment interval into at least one partial group; the entire alignment interval is the aggregate sum of at least one partial alignment interval.

Displacement position: Position expressed by one group {rotational displacement position, horizontal displacement position, vertical displacement position}.

Registered fingerprint
(registered image): Registered fingerprint image or modified image of a registered fingerprint.

Test fingerprint
(test image): Test fingerprint image or modified image of a test fingerprint.

Threshold value: A constant value for use in making judgments using the ratio of an evaluation value to a threshold value; the method for defining a threshold value differs for each evaluation value.

Figure 4A:
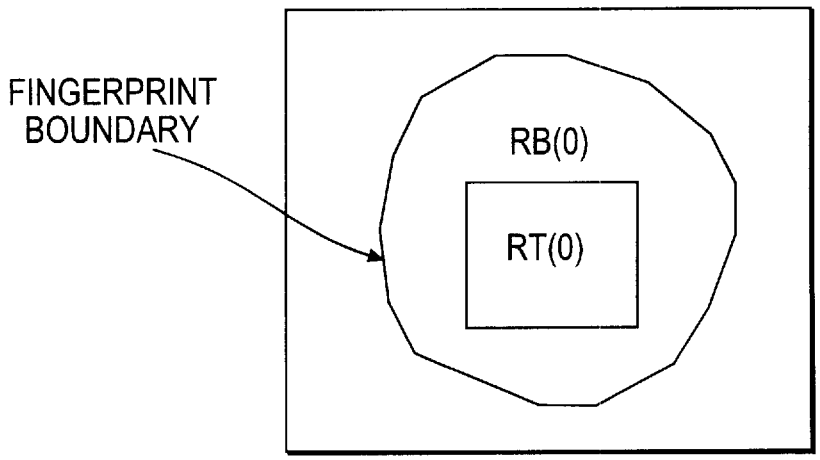
FIGS. 4A–4C shows examples of the divisions of a sub-template and non-sub-template with regard to a fingerprint region.
Figure 4B:
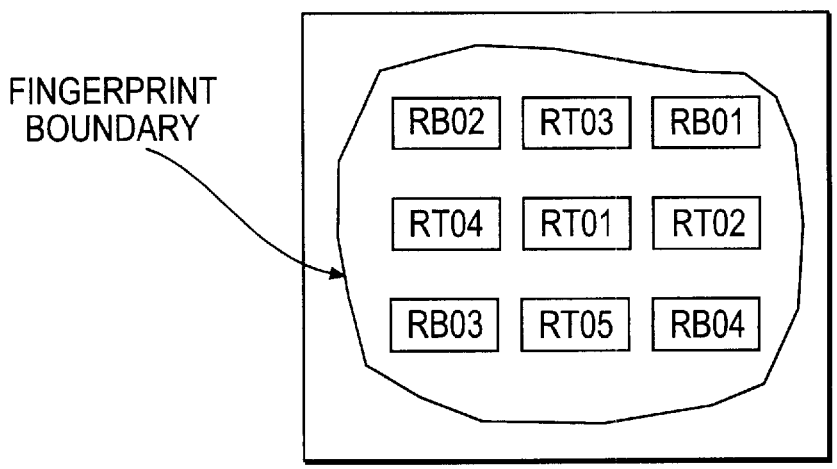
Figure 4C:
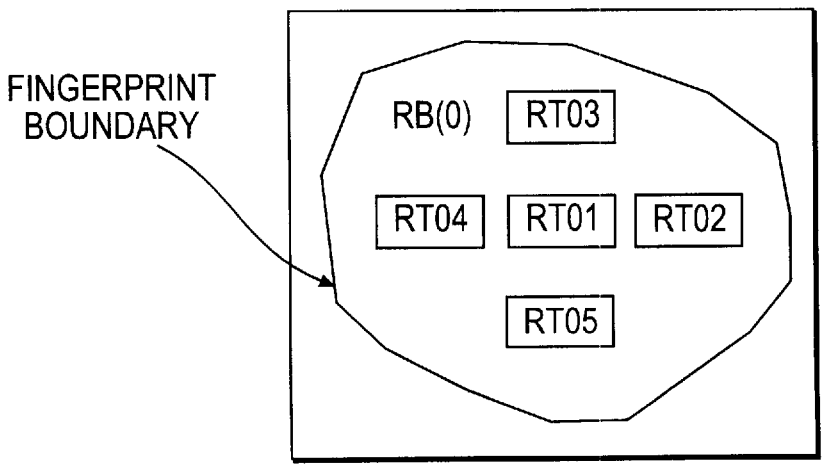

FIGS. 4A–4C show an example of the relationship of a fingerprint region defined by means of a fingerprint boundary to the portion for extracting sub-template RT(0) and to the portion for extracting non-sub-template RB(0), in image 10 of image memory 4. Examples 1–3, shown in FIGS. 4A–4C, respectively, are examples of the sub-template and non-sub-template portions. In Example 2 (FIG. 4B), RT(0)={RT01, RT02, RT03, RT04, RT05} and RB(0)= {RB01, RB02, RB03, RB04}. In Example 3 (FIG. 4C), RT(0)={RT01, RT02, RT03, RT04, RT05}.

In the following, the procedure for processing a fingerprint image will be explained. Further, with regard to each step of the procedure, in the case when the subsequent process is not mentioned, the procedure progresses to the subsequent step. The constants used in each step take into consideration the various conditions of image processing unit 1 and image input unit 2, and designate statically or dynamically appropriate value. The realization of each step as well as the processes linked therein, may be modified provided that the contents of the processing remain the same.

(1) Means for designating a Fixed Moment of Input from Image Input Unit to Image Memory Image 10 which is inputted from image input unit 2 to image memory 4 varies according to the movement the object of image pick-up unit 7 (i.e., in the case when the object is a fingerprint, a finger is put on image input unit 2). As a result, it is necessary to define the moment which designates image 10 of image memory 4. This processing method comprises:

(a) A method for recognizing the fixed moment of an image by means of a signal sent from image input unit 2 to image processing unit 1;

(b) A designating method by means of which a user designates the fixed moment of an image to image processing unit 1; or (c) A defining method by means of which image processing unit 1 defines the fixed moment of an image by means of checking the state of image 10 of image memory 4.

In the following, an example of method (c) will be provided.

When the gray-scale image of a fingerprint has been correctly inputted, the average brightness value lies within a fixed range, and when this state continues, a stable image can be obtained. Utilizing this aspect, in order to increase the quality of the image defining this input, the average brightness value of a previously defined pixel aggregation of the image (e.g., the entire region of the image or one or more partial regions) is calculated. When this average brightness meets specific conditions, the aforementioned image is judged to be a valid image, and when this process is continued such that the number of valid images recognized exceeds a specified number, the last image of image memory 4 which is temporarily fixed is designated.

Based on the aforementioned, an example of the designating method for designating the fixed moment of image input is shown in procedure IN.

(Procedure IN)
Step IN1
  Counter Fa is reset to "0".
Step IN2
  The image input process is commenced, and image of the image memory is temporarily fixed.
Step IN3
  Within a specified region of the image, the average brightness $E_{av}$ of this specified region is calculated, and when this average brightness of this specified region meets certain conditions, the image is judged to be valid, and the procedure moves to step IN4. If the average brightness does not meet the aforementioned conditions, the image is judged to be invalid, and the procedure returns step IN1.

Average brightness $E_{av}$ of a specified region=(Sum of brightness of pixels within the specified region)/(total number of pixel within the specified region)

wherein $E_L \leq E_{av} \leq E_H$;

$E_L$ and $E_H$ are constants which are defined taking into consideration the variable region of brightness in the case when the image to be processed is inputted.

Furthermore, in the case when a plurality of specified regions exist, the average brightness of the specified regions is checked against the specified conditions for each region, and when the number of valid specified regions exceeds a certain threshold value, the image is judged to be valid.

Step IN4

"1" is added to counter Fa.

Step IN5

Fa is checked as to whether or not it has reached a specified value Fat; in the case when Fa has reached a specified value Fat, the procedure moves to step IN6. In the case when Fa has not reached this specified value, the procedure returns to step IN2. The value of constant Fat is designated according to the shortest number of cycles required for the inputted image to be stabilized.

Step IN6

The image of image memory is designated (end of procedure IN).

Figure 5:
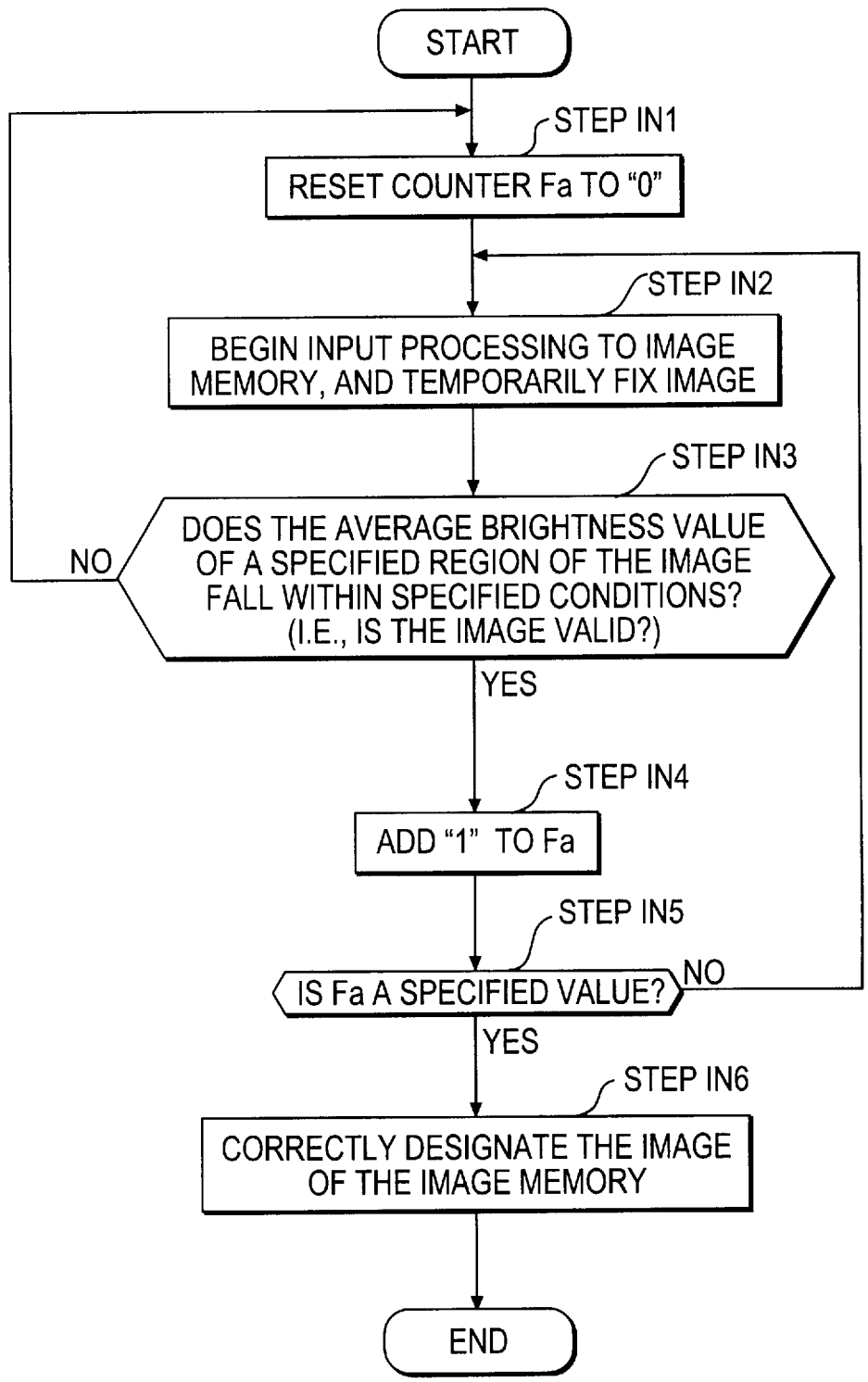
FIG. 5 is a flowchart showing an outline of a procedure IN for continuously confirming the validity of the image input and for designating an image.

FIG. 5 is an outline showing the flow of procedure IN for designating an image by means of continuous recognition of the input and validity of the image.

(2) Image Modifying Means

The properties of the image inputted from image input unit 2 to image processing unit 1 can be improved more effectively by using a smaller number of pixels in the processing over a range in which the recognition precision remains the same. For example, in the case when the number of pixels of the image memory is larger than the number of pixels to be processed (e.g., when the number of pixels of image memory 4 is 640×480 pixels (X=0~639, Y=0~479), and the number of pixels to be processed is 256×240 pixels (X=0~255, Y=0~239)), after the image is inputted into image memory 4, the range of the image corresponding to the input is checked, and a partial aggregation of the image is extracted as a provisional image. Furthermore, from this provisional image, a small image corresponding to the required number of pixels for processing is extracted, and this small image is then converted into a normal image for processing. An example of this image modifying means is shown by procedure ET. (Image modifying procedure ET)

Step ET1 (Extraction of the small image in the X-direction)

Steps ET1a~ET1d are executed.

Step ET1a (Determination of the X-coordinate of the left margin of the provisional image possessing a black pixel):

Ka represents the increasing width in the X-direction (e.g., Ka=1); the following process is conducted until the left margin of the provisional image is found wherein u=0, Ka, 2Ka, 3Ka, . . . (in order).

The total value GA (u) of the brightness of the Y-coordinate (Y=0, Ja, 2Ja, . . . ) which is extracted in the Y-direction at the time when Y=u is calculated, and the value of u, at the time when the existence of a brightness corresponding to a black provisional image is initially confirmed, is designated as the X-coordinate of the left margin of the provisional image. For example, in the case when the image possesses only high brightness values in a state when there is no image input, and if Ja represents increasing width in the Y-direction (e.g., Ja=1), the value of u at the time when it is confirmed that GA (u)<GA, is designated as the X-coordinate of the left margin of the provisional image (note: it is also possible to add the conditions of GA (u+Ka)<GA in order to further increase the reliability of the aforementioned). Constant GA is the threshold value indicating that a black provisional image is present at the time of binary conversion; the total brightness value of provisional extracted in the Y-direction is defined by taking into consideration the brightness value wherein this value approaches a minimum value at the time when black provisional images are incorporated.

Step ET1b (Determination of the X-coordinate of the right margin of the provisional image possessing a black provisional image):

The following process is conducted until the left margin of the provisional image is found wherein v=Xh, Xh−Ka, Xh−2Ka, Xh−3Ka, . . . (in order).

The total value GA (v) of the brightness of the Y-coordinate (Y=0, Ja, 2Ja, . . . ) which is extracted in the Y-direction at the time when X=v is calculated, and the value of v, at the time when the existence of a brightness corresponding to a black provisional image is initially confirmed, is designated as the X-coordinate of the right margin of the provisional image. For example, if Ja represents increasing width in the Y-direction (e.g., Ja=1), the value of v at the time when it is confirmed that GA (v)<GA, is designated as the X-coordinate of the right margin of the provisional image (note: it is also possible to add the conditions of GA (v+Ka)<GA in order to further increase the reliability of the aforementioned).

Step ET1c (Determination of Wx of the X-coordinate of the center point between the left and right margins of the provisional image):

The Wx of the X-coordinate of the center point between the left and right margins of the provisional image is determined by the following formula.

$Wx=(u+v)/2$

Step ET1d (Determination of the initial X-coordinate for extraction of the small image):

The initial X-coordinate Xa of the small image is determined by the following formula.

$Xa=Wx-XL/2$

XL represents the number of provisional in the X-direction of the small image. In order to standardize the size of the small image region, the following equations are formed:

when $Xa<0, Xa=0$;

and when $Xa+Xl-1>Xh, Xa=Xh-XL$.

Step ET2 (Extraction of the Y-directional range of the small image)

In step ET2a~ET2d, the same processes as in step ET1 are conducted with regard to the Y-direction in order to calculate the Y-coordinate range of the small image.

Step ET2a (Determination of the Y-coordinate of the upper margin of the provisional image possessing a black provisional image):

Kb represents increasing width in the Y-direction (e.g., Kb=1); the following process is conducted until the upper margin of the provisional image is found wherein u=0, Kb, 2Kb, 3Kb, . . . (in order).

The total value GB (u) of the brightness of the X-coordinate (Y=0, Jb, 2Jb, . . . ) which is extracted in the X-direction at the time when Y=u is calculated, and the value of u, at the time when the existence of a brightness corresponding to a black provisional image is initially confirmed, is designated as the Y-coordinate of the upper margin of the provisional image. For example, in the case when the image possesses only high brightness values in a state when there is no image input, and if Jb represents increasing width in the Y-direction (e.g., Ja=1), the value of u at the time when it is confirmed that GB (u)<GB, is designated as the Y-coordinate of the upper margin of the provisional image (note: it is also possible to add the conditions of GB (u+Kb)<GB in order to further increase the reliability of the aforementioned). Constant GB is the threshold value indicating that a black provisional image is present at the time of binary conversion; the total value of the brightness values of provisional image extracted in the X-direction is defined by taking into consideration the brightness values wherein this value approaches a minimum value at the time when black provisional are incorporated.

Step ET2b (Determination of the Y-coordinate of the lower margin of the provisional image possessing a black provisional image):

The following process is conducted until the left margin of the provisional image is found wherein v=Yh, Yh–Kb, Yh–2Kb, Yh–3Kb, . . . (in order).

The total value GB (v) of the brightness of the X-coordinate (X=0, Jb, 2Jb, . . . ) which is extracted in the X-direction at the time when Y=v is calculated, and the value of v, at the time when the existence of a brightness corresponding to a black provisional image is initially confirmed, is designated as the Y-coordinate of the lower margin of the provisional image. For example, if Jb represents increasing width in the Y-direction (e.g., Ja=1), the value of v at the time when it is confirmed that GB (v)<GB, is designated as the Y-coordinate of the lower margin of the provisional image (note: it is also possible to add the conditions of GB (v–Kb)<GB in order to further increase the reliability of the aforementioned).

Step ET2c (Determination of Wy of the Y-coordinate of the center point between the upper and lower margins of the provisional image):

The Wy of the Y-coordinate of the center point between the upper and lower margins of the provisional image is determined by the following formula.

$$Wy=(u+v)/2$$

Step ET2d (Determination of the initial Y-coordinate for extraction of the small image):

The initial Y-coordinate Yb of the small image is determined by the following formula.

$$Yb=Wy-YL/2$$

YL represents the number of pixels in the Y-direction of the small image. In order to standardize the size of the small image region, the following equations are formed:

when $Yb<0, Yb=0$;

and when $Yb+YL-1>Yh, Yb=Yh-YL$.

Step ET3 (Extraction of the pixels to be processed)

The range defined by X=Xa~Xa+XL–1, and Y=Yb~Yb+YL–1 is then converted into a small image for processing.

Step ET4 (Conversion of the small image into a normal image)

The conversion for converting the range of the small image into a normal image is performed as necessary; e.g., conversion of the designation of the origin, designated location of the image, etc. (End of Procedure ET)

Figure 6:
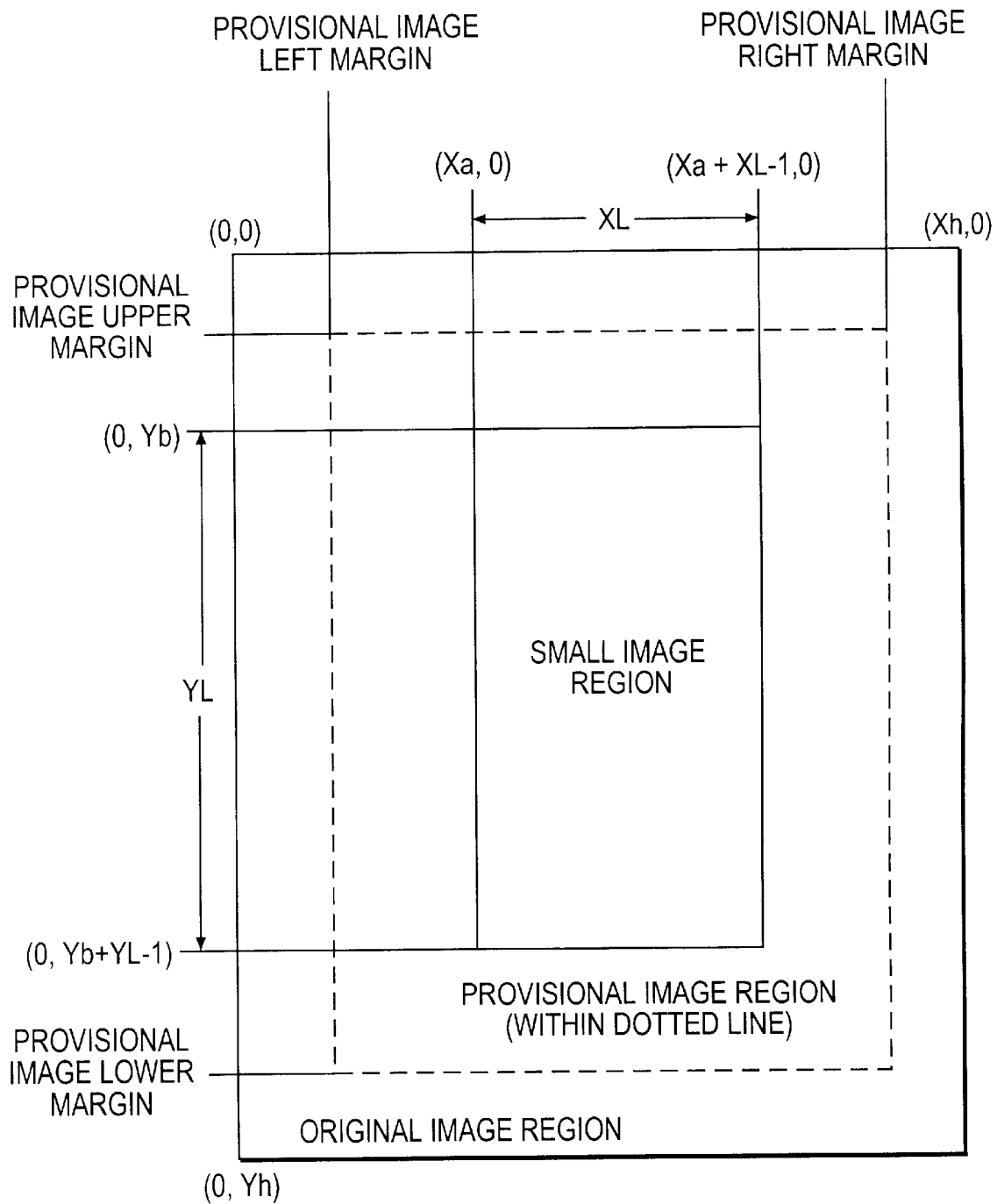
FIG. 6 is a diagram for use in explaining the modification of a processing range of an image.

FIG. 6 is a diagram for use in explaining the conversion of the processing range of an image; this figure shows examples of the image designated by image memory, provisional image and small image. Furthermore, it is also possible to execute procedure ET in only the X-direction or the Y-direction; in this case, the direction in which procedure ET is not being performed serves as a fixed range. In the case when the image of image memory is used as the image for processing, conversion by means of procedure ET is unnecessary.

(3) Smoothing Means

Smoothing is a process for reducing the noise of a fingerprint image. As this smoothing process, any conventional method may be employed (e.g., use of a local summation averaging filter which utilizes the values of neighboring pixels around each pixel).

In the case when a binary image can be directly inputted into image memory 4, smoothing may be omitted. A gray-scale image results from the smoothing of a binary image, thus it is necessary to conduct binary conversion of this image after smoothing.

(4) Binary Conversion and Background Segregation Means

Binary conversion is a process for converting a gray-scale image into a binary image. Background segregation is a process for clarifying the valid range of a fingerprint image of image 10 in image memory 4. In the following, procedure B will be presented as an example of a procedure for conducting binary conversion and background separation. The input information is the input image information. The output information of procedure B is the binary image of the output image and the fingerprint boundary information. In the case when utilizing an image input unit which can directly input the binary image into image memory 4, binary conversion (step B1) is omitted, and only background segregation is performed. Similarly, in the case when only binary conversion is required, i.e., background segregation is unnecessary, it is possible to only perform step B1.

(Procedure B)

K is defined as a constant indicating the X-directional length of a partial region. The Y-directional length of a partial region may differ from the X-directional length of the partial region, however, for the sake of convenience, the case in which these lengths are equal will be presented in the following. In addition, L is defined as follows:

$$L=(X_h+1)/K$$

In the formula, K is selected to produce an integer L. In general, it is possible to vary the length of each partial region.

$$K_{max}=((X_h+1)/K)-1$$

With regard to image 10, the partial region addresses, which uniquely and clearly discriminate each partial region, are designated as initial pixel addresses for each partial region. A random pixel address (X,Y), at partial region address J(M,N), is M=[X/K], and N=[Y/K]. Accordingly, pixel address (X,Y) corresponding to partial region address J(M, N) is obtained by, performing the following calculations:

$$X=K \cdot M, (M=0, 1, 2, \ldots, K_{max})$$
$$Y=K \cdot N, (N=0 1, 2, \ldots, K_{max})$$

Step B1 (binary conversion)

Step B1a:

Processing is performed with regard to the following:

M=0, 1, 2, . . . , $K_{max}$

N=0, 1, 2, . . . , $K_{max}$

The average brightness $B_{av}(M, N)$ of all of the pixels within each partial region is obtained for each partial region J(M, N) using the following equation:

$B_{av}(M, N)$=(the sum of the brightness values of the pixels within a partial region)/(the number of pixels within the partial region)

At this point, (M, N) of

X=K·M (M=0~$K_{max}$)

Y=K·N (N=0~$K_{max}$)

corresponds to the range of image 10. In other words, when the range of the image are 0≦X≦Xh 0≦Y≦Yh the corresponding range becomes M=0~[Xh/K]

N=0~[Yh/K]

and, total number of partial regions in image 10=([Xh/K]+1)·([Yh/K]+1).

In addition, the average brightness of the entire image is obtained as follows.

Average brightness of the entire image=(Sum of brightness values of the entire image)/(Total number of pixels in the entire image).

Step B1b:

In order to reduce the non-continuity generated by the boundaries of the partial regions, the following modifications are carried out when M=1~([Xh/K]−1)

N=1~([Yh/K]−1), then

Cav(M, N)=(A0·Bav(M, N)+A1·Bav(M+1, N)+A2·Bav(M+1, N−1)+A3·Bav(M, N−1)+A4·Bav(M−1, N−1)+A5·Bav(M−1, N)+A6·Bav(M−1, N+1)+A7·Bav(M, N+1)+A8 ·Bav(M+1, N+1))/(A0+A1+A2+A3+A4+A5+A6+A7+A8).

A0, A1, A2, A3, A4, A5, A6, A7 and A8 are constants which are determined by taking into consideration the reciprocal relationships between partial regions. For example, it is possible to set the following:

A0=A1=A2=A3=A4=A5=A6=A7=A8=1

The Cav(M, N) of each (M, N) is then stored in the working area of memory.

Subsequently, it is also possible to change the average brightness Bav(M, N) of each partial region according to the reciprocal relationships between the partial regions (M, N) by means of setting Bav(M, N)=Cav(M, N) for M=1~([Xh/K]−1)and N=1~([Yh/K]−1).

Figure 7:
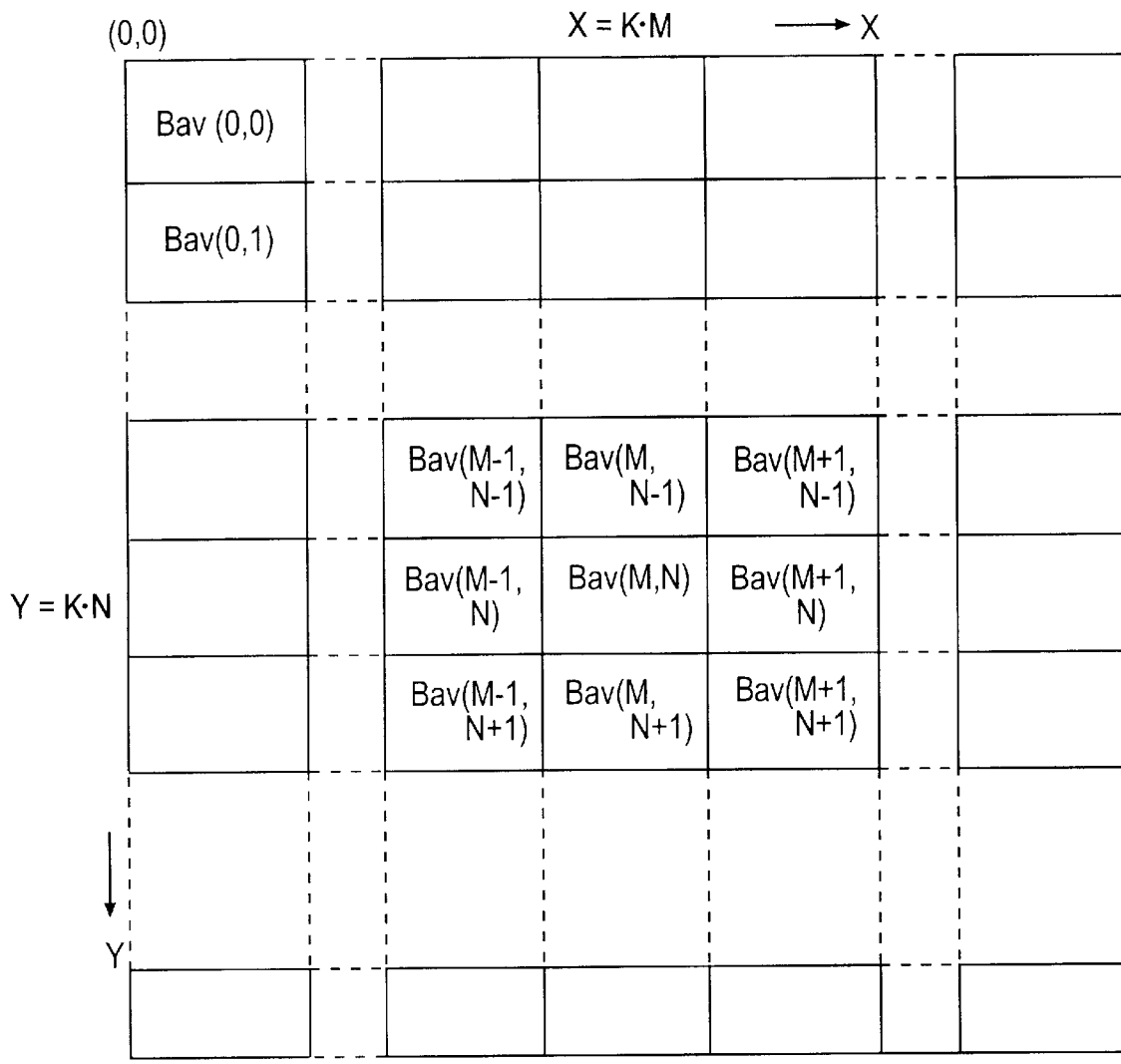
FIG. 7 is an example of the division of an image into partial regions; this figure is for use in explaining the variation of the average brightness of a partial region.

FIG. 7 shows an example of the relationship between a partial region (M, N) and the average brightness Bav(M, N) of this partial region. The method for modifying the average brightness of the partial regions according to the reciprocal relationships of the partial regions is not limited to just the aforementioned processes. For example, it is possible to increase or decrease the number of partial regions, as well as change the formula of the above-mentioned Cav(M, N) using the reciprocal relationships.

Step B1c:

(a) The threshold value T with regard to the brightness f(X,Y) of pixel (X,Y) of the partial region for which $B_{av}(X,Y)$ was calculated with respect to each partial region is set as follows:

T=average value of brightness of a partial region+D+Da wherein D is a constant for correcting the average brightness value of the partial region. Da is a variable (e.g., initially, Da=0) which will be explained hereafter.

When f(X,Y)≧T, (X,Y) for this partial region (M,N), i.e., the (X,Y) of the region defined by

K·M≦X≦K·(M+1)−1

K·N≦Y≦K·(N+1)−1 designates white pixels (however, when reversing the pixels, (X,Y) designates black pixels); while, on the other hand, when f(X,Y)<T, the (X,Y) designates black pixels (when reversing the pixels, (X,Y) is set to white pixels).

As described in the aforementioned, a binary conversion process is provided in which the average brightness values of the partial regions serve as essential components of the threshold value.

When a large number of pixels with high brightness values exist within a partial region, and when the average brightness values of partial regions in which little brightness variation occurs are high, a large number of pixels within a given partial region will be converted to black pixels as a result of binary conversion. In order to prevent this aforementioned result, partial regions possessing a high average brightness, in which there is little brightness variation, undergo binary conversion using a specified threshold value which is previously defined, rather than employing the aforementioned binary conversion threshold value. In the following, a concrete procedure for performing the aforementioned will be explained.

At every partial region of the original image (gray-scale image), when $B_{av}(\cdot,\cdot) \leq B_m$, the above-described binary conversion in which the average brightness serves as the threshold value is employed.

However, when $B_{av}(\cdot,\cdot) \geq B_m$, (Bm is a value for judging whether or not the average brightness is a high value; e.g., in the case when a brightness of 180~255 is regarded as high, $B_m$=180) the following calculation is performed for each pixel within one random partial region:

G=|(average brightness of the partial region)−(brightness of each pixel within the partial region)|

The maximum value $G_{max}$ of these values of G is then calculated, and in the case when $G_{max} \leq B_{small}$ ($B_{small}$ represents the upper limit of change in the range of the brightness; e.g., in the case when change of brightness ranges from 0~10, a minute variation in brightness may be indicated by $B_{small}$=10), the pixels of the above partial region are regarded as showing little variation in brightness, and hence this partial region undergoes binary conversion using a specified binary conversion threshold value T=$B_g$ (e.g., $B_g$ represents the average brightness of the entire image or a fixed value).

Figure 8:
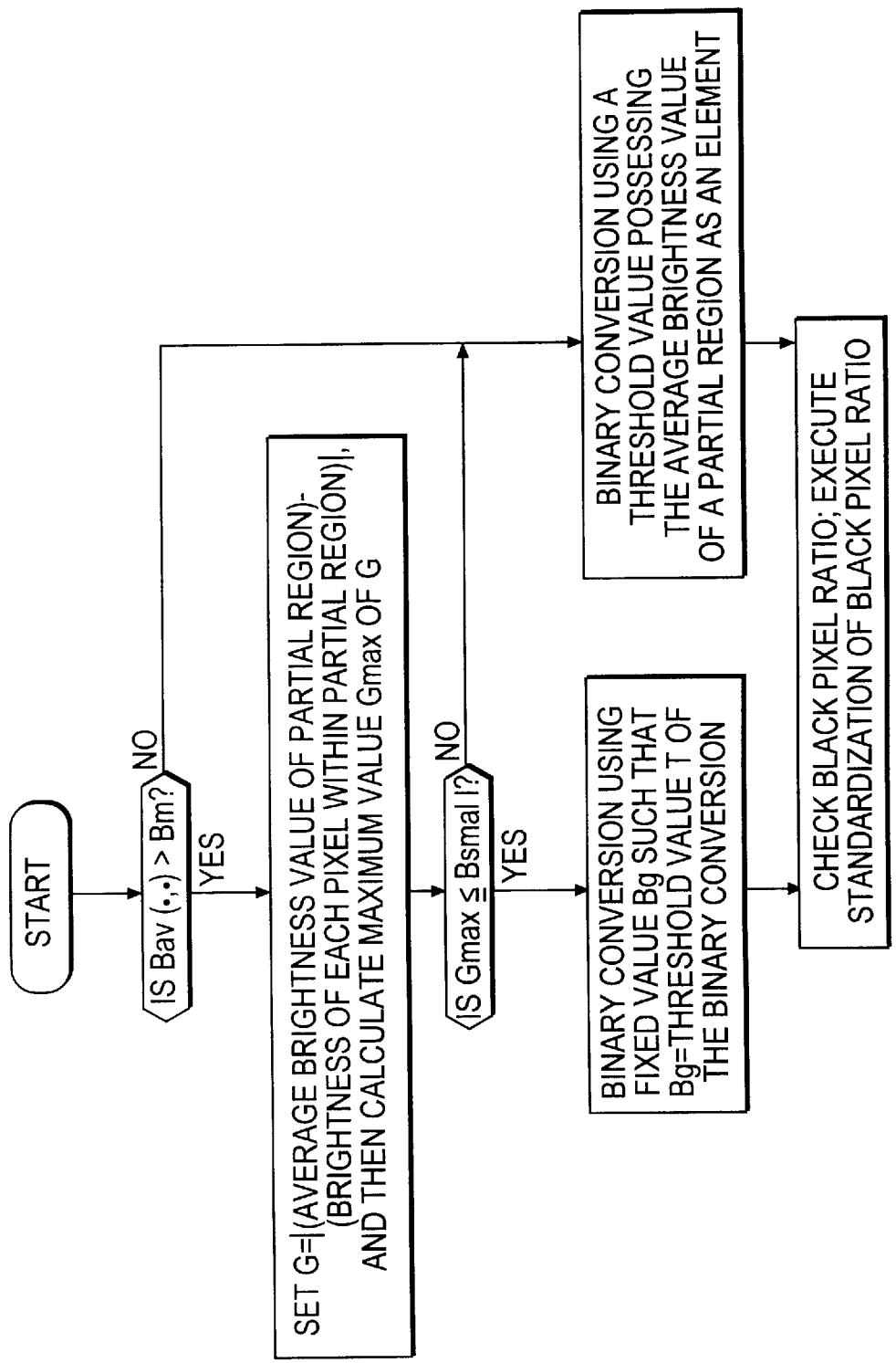
FIG. 8 is a flowchart showing an outline of a binary conversion process occurring in a partial region in which there is little variation of the brightness.

This procedure is repeated for all partial regions of the original image. FIG. 8 is a flowchart showing an outline example of the binary conversion process performed on partial regions in which there is little brightness variation.

In the following process, the brightness states of the image differ depending on the conditions at the time of image input. Therefore, the ratio of black pixels of the partial region to total pixels is first calculated, and when this value falls outside of a specified range, the value of Da is modified, and binary conversion is repeated a specified number of times (at least once). The procedure for optimizing the threshold value of the binary conversion will be presented in the following.

The ratio of black pixels in all valid partial regions $R_{bw}$ is calculated as follows:

$R_{bw}$=(Number of black pixels in all partial regions)/(Total number of pixels in all partial regions)

When $R_{bw1} \leq R_{bw} \leq R_{bw2}$, the ratio of black pixels is normal, and binary conversion can then be completed. However, when $R_{bw} > R_{bw2}$, T is reduced in order to decrease the number of black pixels. In other words, $D_a$ is replaced by $(D_a - D_{a1})$. When $R_{bw} < R_{bw1}$, T is increased in order to increase the number of black pixels, i.e., $D_a$ is replaced with $(D_a + D_{a1})$.

$R_{bw1}$ and $R_{bw2}$ are constants for standardizing the ratio of black pixels: e.g., when a black pixel ratio of 40~45% is desired, $R_{bw1}$ and $R_{bw2}$ are set to 0.40 and 0.45, respectively. $D_{a1}$ is a constant for increasing/decreasing the threshold value of the binary conversion (e.g., $D_{a1}$=1). When the ratio of black pixels is calculated using binary conversion, and this ratio falls outside of a specified range, the threshold value T of the binary conversion is modified, and the binary conversion process is repeated a specified number of times. When the ratio of black pixels remains outside of a specified range even after repeating the binary conversion process a specified number of times, the procedure may be abandoned, for example, and then restarted from the input of the image.

Figure 9A:
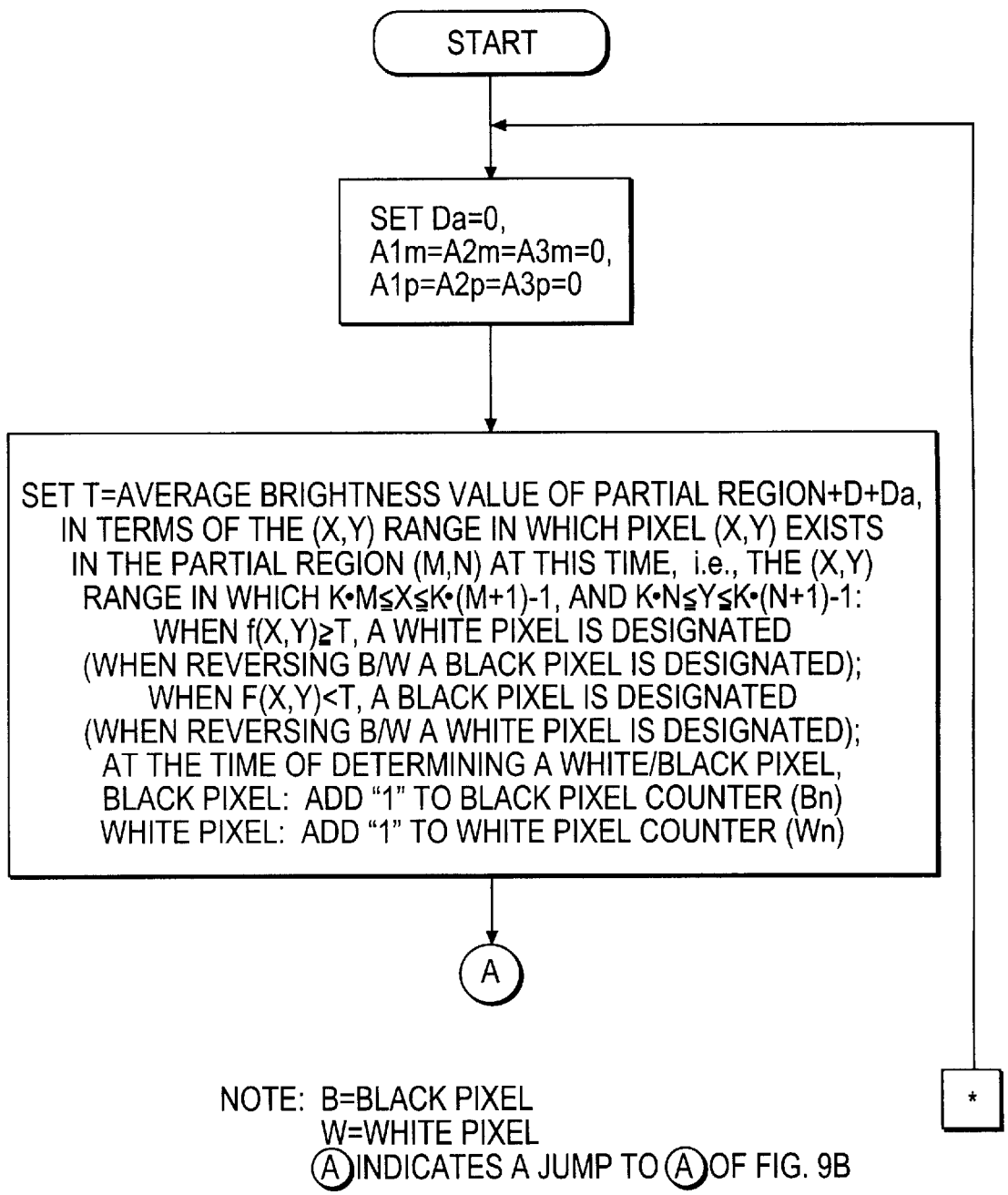
FIGS. 9A and 9B show an outline example of a process for standardizing the ratio of binary converted black pixels of a binary image which has been divided into partial regions.
Figure 9B:
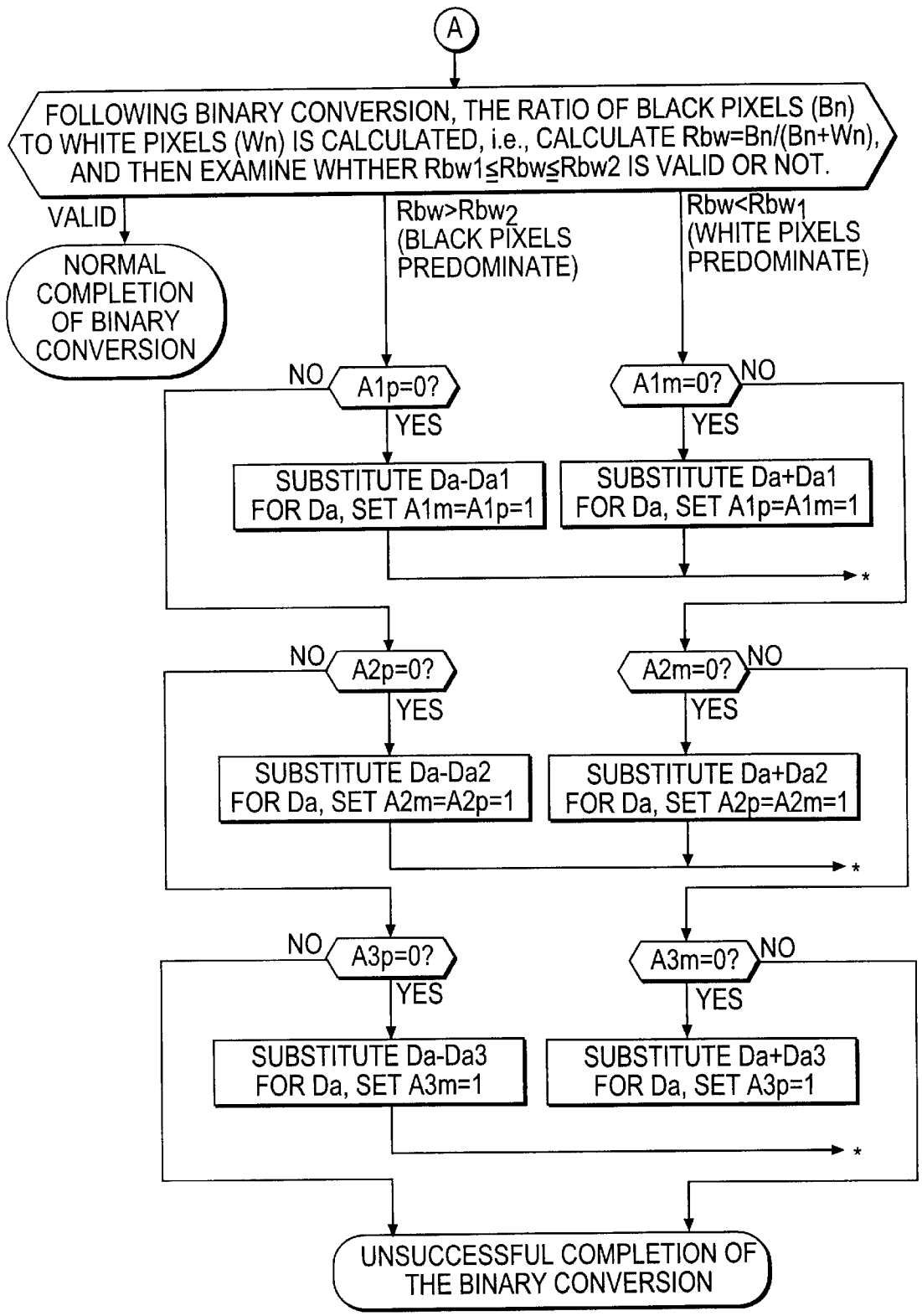

$D_{a1}$ may reduce the processing time in order to allow for the ratio of black pixels to fall within a specified range, and may also utilize a plurality of different values in order to increase the probability of the ratio of black pixels falling within a specified range. With regard to the binary image divided into partial regions, FIGS. 9A and 9B show an example of the process for standardizing the ratio of binary converted black pixels. The constant group consisting of $D_{a1}$, $D_{a2}$ and $D_{a3}$ (e.g., $D_{a1}$=3, $D_{a2}$=2, and $D_{a3}$=1) is used for modifying $D_a$. $D_{ai}$ (i=1, 2, . . . ) can be structured using an optional number of constants. By means of designating an appropriate number of constant groups and values, the possibility and convergence speed of converging the value of $R_{bw}$ to within a specified range can be improved. Furthermore, in FIGS. 9A and 9B, $A_{1p}$, $A_{1p}$, $A_{3p}$, $A_{1m}$, $A_{2m}$ and $A_{3m}$ are parameters which change dynamically during the processing in order to select the procedures involved.

Step B2 (Indication of a valid partial region)

The average brightness of the partial region is then re-calculated with respect to the binary image obtained as a result of step B1. Next, for Partial region address $I_{MN}$=([X/K],[Y/K])

(The partial region address is the initial address of each partial region)

X=K·M,(M=0, 1, 2, . . . $K_{max}$)

Y=K·N,(N=0, 1, 2, . . . $K_{max}$)

a judgment of "valid" or "invalid" is rendered for each partial region according to the average brightness value $B_{av}(X,Y)$ calculated from the process for calculating the average brightness for each partial region. In other words, in a partial region where $B_L \leq B_{av}(X,Y) \leq B_H$, this partial region is judged to be a valid partial region, and valid indicator is designated in partial region table Y(M,N).

Y(M,N)={1: Valid partial region. 0: Invalid partial region}

$B_L$ and $B_H$ are constants for classifying valid and invalid partial regions.

Step B3 (Examination of the number of valid partial regions) From Y(M,N),

YT=number of valid partial regions is counted. When YT≧YC (e.g., YC=the total number of partial regions x threshold ratio constant), the procedure moves to step B4. When YT<YC, the a shortage in the number of valid partial regions has occurred, and hence present procedure ends due to an error.

Step B4 (Left margin of the fingerprint boundary of a partial region unit):

The information of the fingerprint boundaries of a partial region is represented by $\{(N_T, M_L, M_R), N_T$=0~$K_{max}\}$. For each N=$N_T$ value, $M_L < M < M_R$ is the fingerprint area of the partial region unit.

In this step, the left margin $M_L$ of the fingerprint boundary is calculated for the each partial region unit. Starting from N=0, the following process is carried out for N=$N_T$, ($N_T$= 0~$K_{max}$). Beginning from the left margin (M=O) and continuing in the direction of increasing M, a search is sequentially conducted for elements G(M,N) possessing an indicator of "1" (indicating an valid partial region) in table G, which shows the valid partial regions. The value ML of the initial M of a section in which indicators having a "1" value are continuous for $K_C$ ($K_C$ is a constant ≧1 for judging the fingerprint boundaries of the partial region) indicators or more is set as the left margin of the fingerprint area. At M=0~$K_{max}$, when indicators having a value of "1" (indicating a valid partial region) are not found to be continuous for $K_C$ indicators or more, the value of the current N is the non fingerprint area for all M. Additionally, at $N_T$ of the non fingerprint area, $M_L = M_R = -1$.

Step B5 (Right margin of the fingerprint boundary for each partial region)

In this step, the right margin $M_R$ of the fingerprint boundary is calculated for each partial region unit. Starting from N=0, for N=$N_T$ ($N_T$=0~$K_{max}$), any N for which the left margin was not set in step B4 (i.e., N when $M_L$=-1) is skipped. Beginning from the left margin (M=$K_{max}$) and continuing in the direction of decreasing M, a search is sequentially conducted for elements G(M,N) which are indicated by "1" (indicating an valid partial region). The value $M_R$ of the initial M of a section in which indicators having a value of "1" are continuous for $K_C$ ($K_C$ is a predetermined number) or more indicators is set as the right margin of the fingerprint area for the current N. From the preceding, the partial region fingerprint boundary information $\{(N_T, M_L, M_R), N_T$=0~$K_{max}\}$ is calculated.

Step B6 (Fingerprint boundary information of each pixel)

The fingerprint boundary information of each pixel is calculated from the fingerprint boundary information $\{(N_T, M_L, M_R),$ NT=0~$K_{max}\}$ for each partial region. The fingerprint boundary information of each pixel is shown by $\{(Y_T, X_L, X_R), Y_T$=0~(Yh-1)$\}$. For each value of $Y_T$, $X_L \leq X \leq X_R$ is the fingerprint area.

According to the fingerprint boundary information of the partial region, in N=0~$K_{max}$, with regard to Y=$Y_T$ of K×N≦Y≦K×N+$K_{max}$, the fingerprint boundary information $\{(Y_T, X_L, X_R), Y_T$=0~(Yh-1)$\}$ of each pixel is calculated wherein:

$X_L = K \cdot M_L$ $X_R = K \cdot M_R + K_{max}$ (End of procedure B)

FIG. 10 is an example of a Table G showing the valid partial regions of a fingerprint. When K=16, "1" indicates valid and "0" indicates invalid. The shape of the fingerprint image in FIG. 10 is unrelated to the shape of images in other figures. From this point on, for the sake of simplicity, the term "fingerprint boundary information" will indicate the fingerprint boundary information $\{(Y_T, X_L, X_R), Y_T$=0~

(Yh−1)} of each pixel. In addition, with regard to background segregation, it is possible to simply process the entire image as the fingerprint region in place of steps B4~B6.

(5) Means for calculating an approximate center point With regard to the approximate center point of the fingerprint image, a means is provided for calculating the center point ([Xh/2], [Yh/2]) of image 10 or an approximate center point ($X_C$, $Y_C$) from among neighboring points. In addition, it is also possible to optionally use a conventional means for calculating the approximate center point.

(6) Thinning Means

Thinning is a process for setting the majority of a line width of an image to one pixel. It is possible to optionally use any thinning method (e.g., conventional thinning methods mentioned before) as the thinning means.

(7) Narrowing Process

The narrowing process maintains the majority of the line widths of an image to a specified line width or less. This narrowing process is basically achieved by means of standardizing the ratio of black pixels to total pixels (optionally, the ratio of white pixels to total pixels or ratio of black pixels to white pixels) in the binary conversion process, hence this is considered an aspect of the narrowing process as well. Furthermore, the following methods can be used to narrow the line width of a binary image.

Aggregations of one or more black pixels are treated as the lines of an image. The method of maintaining the designated line width value is optional, as it is possible to maintain a designated value as input information of the narrowing process and/or maintain this value within the narrowing process. It is also possible to maintain one or more designated line width values within a single narrowing process. In the preferred embodiments of the present invention, the procedure of narrowing can be appropriately used in response to the designated line width value. An example of a narrowing process which depends on the designated line width value is presented below.

(a) Narrowing process for setting the majority of line widths to one pixel (Designated line width value is one pixel)

It is possible to use a conventional method (i.e., a thinning method which can set the majority of the line widths to the width of one pixel) as a procedure for narrowing the line width of a binary image (or a procedure for binary converting a gray-scale image and narrowing the line width therein). Furthermore, other methods also exist for directly performing binary conversion and narrowing of a gray-scale image.

(b) Narrowing process for narrowing the majority of lines to a width below a designated line width (Designated line width value is a random integer)

This process may also be realized using a conventional method. For example, a method such as the following is available.

i) In the case when a narrowing process, in which the process of removing the components of a line, one pixel at a time, is repeated from the outer side of a line forming an image (in the preferred embodiments of the present invention, this corresponds to the black pixels which represent the fingerprint lines) until the majority of the line widths are modified to one pixel, it is possible to set the repetition number in the narrowing process as follows:

Repetition number={(Maximum line width of original binary image)−(designated line width value)}/ (Approximate number of pixels to be deleted from each line width using a single image plane treatment process)

ii) Narrowing method in which black pixels are kept in the center of the line components forming an image With regard to the black pixels on the line segment of a section where an random straight line and the line of an image intersect, narrowing can be accomplished by means of keeping black pixels below a designated line width value including the center point of said line segment (in the case when the line segment width exceeds the designated line width value, the center point of the line segment is set as the center and the black pixels of the designated line width value are kept; all black pixels on the line segment which does not satisfy the designated line width value are kept).

In the preferred embodiments of the present invention, when performing the narrowing process on a registered fingerprint image and a test fingerprint image, the designated line width value may be randomly set. However, it is necessary to define this value on the basis of such factors as the quality and characteristics of the input image, the performance with respect to the designated line width value in the narrowing process, the performance required by image processing device 1, and the like. If the difference between the designated line width values in the narrow processing of a registered fingerprint and a test fingerprint, respectively, is large, the errors in aligning both images becomes considerable. If this aforementioned difference becomes too large, a decrease in the accuracy of the comparison sometimes occurs. Providing a smaller line width for the modified image of a registered fingerprint allows for a reduction in the amount of memory required for registered information due to a decrease in the number of pixels. Taking the aforementioned into consideration, either of the following designations will be effective.

(a) In the narrowing process of a registered fingerprint image, the designated line width value is set to one pixel; in the narrowing process of a test fingerprint, the designated line width value is appropriately set to a value of at least two pixels.

(b) The designated line width values are appropriately selected according to the conditions wherein the designated line width value for the narrowing process of a registered fingerprint is set to a value smaller than the designated line width value of the test fingerprint.

(c) In the processing of a registered fingerprint image, the designated line width value is set to one pixel; in the narrow processing of a test fingerprint, the designated line width value is appropriately adjusted according to the ratio of black pixels at the time of binary conversion (this case is presented in the following embodiment).

(8) Process for recording the registered information of a registered image

The process of recording fingerprint information involves extracting sub-template RT(0) and non-sub-template RB(0) from the modified image Rth of the registered fingerprint in image 10, which results from inputting a registered fingerprint into image 10 of image memory 4 and then performing the above narrowing process, and then storing the aforementioned sub-template RT(0) and non-sub-template RB(0) in respective file memory. The procedure for performing this recording process of the fingerprint information is illustrated by procedure R. The input information of procedure R is the file name of the sub-template and non-sub-template of the registered fingerprint, the modified image Rth of the registered fingerprint, the fingerprint boundary information of the registered fingerprint and the approximate center point of the registered fingerprint ($X_{RC}$, $Y_{RC}$). The output information of procedure R is the file of the sub-template RT(0) and the file of the non-sub-template RB(0).

(Procedure R)
Step R1 (Formation of sub-template RT(0))

Black pixel addresses within the fingerprint area and within the range of sub-template RT(0) are extracted from modified image Rth of the registered fingerprint to form the file of sub-template RT (0). In the storage file of RT(0), the approximate center point of the registered fingerprint ($X_{RC}$, $Y_{RC}$) is also stored.

Step R2 (Formation of non-sub-template RB(0))

A black pixel address which is outside sub-template RT(0) and within fingerprint area FA is extracted from modified image Rth of the registered fingerprint to form the file of non-sub-template RB(0).

Furthermore, storage format of each file of the sub-template and non- sub-template is optional. For example, data may be compressed and stored in a file, and, at the time of utilization, data elongation may be performed.

Step R3

Step R3a (Formation of a file RSa of a sweat gland hole)

This step is executed in the case when optionally selecting to check a sweat gland hole. In a previously determined region of a registered fingerprint, a specified number of addresses corresponding to holes (holes formed by white pixel aggregations in a binary image wherein ridge lines are represented by black pixels) formed from sweat glands exceeding a predetermined size are calculated by using means for a hole search, and the central address among these addresses is recorded in the file of a sweat gland hole.

Step R3b (Formation of a file RSb of a sweat gland non-hole)

This step is executed in the case when optionally selecting to check a sweat gland non-hole. In a previously determined region of a registered fingerprint, a specified number of addresses, corresponding to areas in which sweat glands exceeding a predetermined size do not exist, are calculated by means of a non-hole searching means, and the central address among these addresses is recorded in the file of a sweat gland non-hole.

(End of procedure R)

(9) Hole Search Means (Procedure WH)

An example of a hole is shown in FIG. 11A. In the example, the vicinity surrounding P0 is a hole. It is possible to detect the aforementioned hole by means of the following procedure WH. (Procedure WH)

Step WH1

In searching for a hole in the image, prospective addresses are sequentially examined, and a random white pixel address A is selected. With regard to this prospective address, it is possible, for example, to select all of the pixels, pixels separated by an interval of n pixels (n=2, 3, 4, etc.), and the like.

Step WH2

The pixels connected around the neighborhood of the white pixels of address A are checked in order to determine whether or not a white pixel aggregation AA, in which a specified number of pixels are connected, exists. In the case when this white pixel aggregation AA does not exist, the process is re-executed from the beginning of procedure WH, while in the case when this white pixel aggregation AA exists, the procedure moves to step WH3.

Step WH3

In this step, a check is conducted as to whether or not the white pixel aggregation AA is surrounded by a group of connected black pixels. In the case when a series of connected black pixels do not surround white pixel aggregation AA, the process is re-executed from the beginning of procedure WH. In the case when white pixel aggregation AA is surrounded by a group of connected black pixels, white pixel address A is recognized as the address of a hole.

Step WH4

The present procedure WH is then repeated on all prospective addresses to be searched.

(End of procedure WH)

(10) Non-Hole Search Means (Procedure NWH)

An example of a non-hole is shown in FIG. 11 B. In the example, the vicinity surrounding P0 is not a hole. It is possible to detect the aforementioned non-hole by means of the following procedure NWH.

(Procedure NWH)

Step NWH1

In searching for a non-hole in the image, prospective addresses are sequentially examined, and a random black pixel address B is selected. With regard to this prospective address, it is possible, for example, to select all of the pixels, pixels separated by an interval of n pixels (n=2, 3, 4, etc.), and the like.

Step NWH2

The pixels connected around the periphery of the black pixels of address B are checked in order to determine whether or not a black pixel aggregation BB, in which a specified number of pixels are connected, exists. In the case when this black pixel aggregation BB does not exist, the process is re-executed from the beginning of procedure NWH. In the case when this black pixel aggregation BB exists, black pixel address B is recognized as the address of a non-hole.

Step NWH3

The present procedure NWH is then repeated on all prospective addresses to be searched.

(End of procedure NWH)

(11) Image Data Recording Means

When storing the address of each black pixel (X,Y) as originally presented in a file, the memory capacity required is as follows:

Memory Capacity=(Number of black pixels)·[(Unit memory capacity of X-coordinate)+(Unit memory capacity of Ycoordinate)]

It is necessary to store information regarding the sub-template and the non-sub-template, respectively, in the files of a registered fingerprint image. In order to reduce the amount of storage data to less than when black pixel addresses of a binary image are recorded in their original states, the data is compressed and recorded in a file without an increase in the processing amount. The following process is an example of the aforementioned.

The following case is for a 4×4 pixel aggregation. A 4×4 pixel aggregation is shown in FIG. 3B for optional representative pixel $P_0$. The black and white classification of each pixel is shown by bits. With regard to $P_0$~$P_{15}$, the black pixel and white pixel states of each neighboring pixel can be shown by means of the 2 byte pixel aggregation code Q (0000~FFFF by hexadecimal digits), in accordance with the following:

$Q=P_{15}\|P_{14}\|P_{13}\| \ldots \|P_7\|P_6\|P_5\|P_4\|P_3\|P_2\|P_1\|P_0$

The pixel address (X,Y) shown in FIG. 3 (b) which is determined by means of the representative pixel $P_0=(X_0,Y_0)$ and the relative position therein, is expressed as follows:

$P_1$: $X=X_0-1$ $Y=Y_0$ $P_2$: $X=X_0-2$ $Y=Y_0$ $P_3$: $X=X_0-3$, $Y=Y_0$ $P_4$: $X=X_0$, $Y=Y_0-1$ $P_5$: $X=X_0-1$, $Y=Y_0-1$ $P_6$: $X=X_0-2$, $Y=Y_0-1$ $P_7$: $X=X_0-3$, $Y=Y_0-1$
$P_8$: $X=X_0$, $Y=Y_0-2$
$P_9$: $X=X_0-1$, $Y=Y_0-2$
$P_{10}$: $X=X_0-2$, $Y=Y_0-2$
$P_{11}$: $X=X_0-3$, $Y=Y_0-2$
$P_{12}$: $X=X_0$, $Y=Y_0-3$
$P_{13}$: $X=X_0-1$, $Y=Y_0-3$
$P_{14}$: $X=X_0-2$, $Y=Y_0-3$
$P_{15}$: $X=X_0-3$, $Y=Y_0-3$

The compression processing of the registered fingerprint image data involves converting the (X,Y) coordinate of the registered fingerprint image data (X=0~Xh, Y=0~Yh) to the following form. With regard to the area within the valid region of a fingerprint, each fourth X-coordinate is set to each fourth Y-coordinate as the representative pixel, after which the range of the 4×4 pixel aggregation is checked to determine whether or not any black pixels exist. The X-coordinate of the representative pixel and the pixel aggregation code are only stored in the case when black pixels are present.

In order to designate the portion of the X-address at four pixel intervals, the lower two bits may be used as format identification data of the pixel aggregation. In this manner, when half (lower half, upper half or left half) of the pixel aggregation code is represented by white pixels, a partial pixel aggregation is expressed by one byte of the remaining half of the pixel aggregation code (in accordance with the above-mentioned order, upper half, lower half, or right half).

(a) When the format identification data of the pixel aggregation is expressed by a bit indicator of "11", the pixel aggregation code is expressed by two bytes (i.e., $P_{15}\|P_{14}\| \ldots \|P_1\|P_0$).

(b) When the format identification data of the pixel aggregation is expressed by a bit indicator of "10", the pixel aggregation code is expressed by one byte of the upper half (i.e., $P_{15}\|P_{14}\|P_{13}\|P_{12}\|P_{11}\|P_{10}\|P_9\|P_8$). (c) When the format identification data of the pixel aggregation is expressed by a bit indicator of "01", the pixel aggregation code is expressed by one byte of the lower half (i.e., $P_7\|P_6\|P_5\|P_4\|P_3\|P_2\|P_1\|P_0$).

(d) When the format identification data of the pixel aggregation is expressed by a bit indicator of "00", the pixel aggregation code is expressed by one byte of the right half (e.g., $P_{13}\|P_{12}\|P_9\|P_8\|P_5\|P_4\|P_1\|P_0$).

When the pixel aggregation code is expressed by 1 byte, the omitted pixels are all white pixels. In the case when the pixel aggregation code is expressed by 1 byte, conversion of the X-address portion, incorporating two bits for use in the format identification data of the pixel aggregation, into a pure X-address is possible by means of setting the bit portion for use in the format identification data flag of the pixel aggregation to "0".

In other words, at the time of compression, the (X,Y) coordinates of the image data (i.e., X=0~Xh, Y=0~Yh) is converted to the following form. Each fourth X-coordinate is set to each fourth Y-coordinate as the representative pixel, after which the range of the 4×4 pixel aggregation is checked to determine whether or not any black pixels exist. The X-coordinate of the representative pixel and the pixel aggregation code are only stored in the case when black pixels are present. An example of the process for recording the binary image at this time is illustrated by procedure G below.

(Procedure G)

Step G1

Based on the X-address portion, 4×4 pixel aggregations are sequentially selected. All of the pixels ($P_{15}$~$P_0$) are then checked to determine whether or not these pixels are all white pixels. When all of the pixels are white pixels, the current 4×4 pixel aggregation is skipped, and step G1 is conducted on the subsequent 4×4 pixel aggregation from the beginning. When all of the pixels are not white pixels, the procedure moves to step G2.

Step G2

The upper half of the pixel aggregation ($P_{15}$~$P_8$) is then checked to determine whether or not these pixels are all white pixels. When all of the pixels are not white pixels, the procedure moves to step G3. When the upper half contains all white pixels, the lower half of the pixel aggregation ($P_7$~$P_0$) is expressed by a pixel aggregation code of 1 byte. The lower two bits of the X-address portion are then set to a bit pattern of "01".

Step G3

The lower half of the pixel aggregation ($P_7$~$P_0$) is then checked to determine whether or not these pixels are all white pixels. When all of the pixels are not white pixels, the procedure moves to step G4. When the lower half contains all white pixels, the upper half of the pixel aggregation ($P_{15}$~$P_8$) is expressed by a pixel aggregation code of 1 byte. The lower two bits of the X-address portion are then set to a bit pattern of "10".

Step G4

The left half of the pixel aggregation ($P_{15}$, $P_{14}$, $P_{11}$, $P_{10}$, $P_7$, $P_6$, $P_3$, $P_2$) is then checked to determine whether or not these pixels are all white pixels. When all of the pixels are not white pixels, the procedure moves to step G5. When the left half contains all white pixels, the right half of the pixel aggregation ($P_{13}\|P_{12}\|P_9\|P_8\|P_5\|P_4\|P_1\|P_0$) is expressed by a pixel aggregation code of 1 byte. The lower two bits of the X-address portion are then set to a bit pattern of "00".

Step G5

In this step, the 4×4 pixel aggregation is expressed by a pixel aggregation code of 2 bytes. The lower two bits of the X-address portion are then left in their original form (i.e., bit pattern of "11").

Step G6

The processing of this pixel aggregation code and X-address is then completed.

Step G7

Steps G1~G6 are then repeated with respect to all 4×4 pixel aggregations for each X-address.

Step G8

In this step, the binary image is recorded by setting the file storage format as follows:

Y-coordinate=Ys, number of groups in stored X-address portion,

{(X-address portion of representative pixel As (including 2 bits of the format identification data of the pixel aggregation), Pixel aggregation code), (X-address portion of representative pixel Bs (including 2 bits of the format identification data of the pixel aggregation), Pixel aggregation code), . . . }

. . .

Y=3+4j, number of groups in stored X-address portion,

{(X-address portion of representative pixel Aj (including 2 bits of the format identification data of the pixel aggregation), Pixel aggregation code), (X-address portion of representative pixel Bj (including 2 bits of the format identification data of the pixel aggregation), Pixel aggregation code), . . . }

. . .

Y=Ye: number of groups in stored X-address portion,

{(X-address portion of representative pixel Ah (including 2 bits of the format identification data of the pixel aggregation), Pixel aggregation code), (X-address portion of representative pixel Bh (including 2 bits of the format identification data of the pixel aggregation), Pixel aggregation code), . . .}, {termination indictor}
(End of Procedure G)

The number of groups of the stored X-address portion indicates the number of pixel aggregation codes corresponding to the Y-coordinate at the time to be stored. The number of groups of the stored X-address portion are determined without designating a Y-coordinate of "0". In addition, 4×4 pixel aggregations which contain only white pixels are not recorded. The pixel aggregation codes may be expressed by either 1 byte or 2 bytes, and are classified by the lower two bits of the X-address portion. Furthermore, it is also possible to add groups of termination signals (e.g., of the X-address portion of the representative pixel and pixel aggregation code) at each Y-coordinate value in place of the groups of the stored X-address portion.

FIG. 12A show an example of the case when the image memory is divided into small regions of 4×4 pixel aggregations. FIG. 12B shows an example of the upper half of a 4×4 pixel aggregation. FIG. 12C shows an example of the lower half of a 4×4 pixel aggregation. FIG. 12D shows an example of the right half of a 4×4 pixel aggregation. Furthermore, in the aforementioned, the case in which the image memory is divided into small regions of 4×4 pixel aggregations is presented, however, it is possible to optionally designate both the size of the small regions and the method of division within the small regions.

In addition, in order to return the format of the binary image data compressed in procedure G back to its original (X,Y) form, it is sufficient to simply reverse the sequence of procedure G.

(12) Means for Comparing a Registered Image and Test Image

Comparison process is a process for checking the concordance of each black pixel of a black pixel aggregation in a modified image of a test fingerprint, with each black pixel in a black pixel aggregation which has been stored in memory 6 as registered information relating to the modified image of a registered fingerprint.

Coordinate conversion by means of rotational and parallel displacement in order to align a registered fingerprint and a test fingerprint, can be carried out for either image. However, in the preferred embodiments herein, the modified image of the registered fingerprint is displaced to align it with the modified image of the test fingerprint, since the modified image of the registered fingerprint has a smaller value than the designated line width value of the narrowing process. An outline of the comparison process is described below.

(a) Comparison of the Sub template

The comparison of the sub-template is the process of calculating the position at which the black pixels of the image of the registered fingerprint and the black pixels of the image of the test fingerprint have the greatest degree of concordance. In other words, first, a sub-template RT(0,H, V), in which the approximate center point of the registered fingerprint has been aligned with the approximate center point of the test fingerprint, is calculated for sub-template RT(0) of modified image of a registered fingerprint by means of parallel displacement of the coordinate axis of this registered fingerprint. Subsequently, following the rotational and up/down, left/right parallel displacements of the coordinate axis of sub-template RT(0,H,V) in the neighboring area about the center, the transformation angle S and the parallel displacement quantity (horizontal displacement quantity H, vertical displacement quantity V) of sub-template RT(S,H,V) of the modified image of the registered fingerprint, at the point where the degree of concordance between the black pixels of the registered fingerprint and the black pixels of the image of the test fingerprint is greatest, are calculated (S,H,V are integers).

(b) Comparison of the non-sub-template, and comparison of the template

The comparison of the non-sub-template is the process of outputting information relating to the concordance of the registered fingerprint and the test fingerprint by means of performing coordinate conversion of the black pixel address of RB(0) of the modified image of the registered fingerprint according to S, H, V of RT(S,H,V) of the registered fingerprint obtained in the comparison of the sub-templates to calculate the black pixel address, and then checking the concordance of this black pixel address with the black pixel address of the modified image of the test fingerprint. In other words, initially, coordinate transformation of the black pixels of non-sub-template RB(0) of the registered fingerprint is performed using the angular rotational quantity S, horizontal displacement quantity H, and vertical displacement quantity V, of the coordinate axes of the sub-template of the modified image of the registered fingerprint obtained above to obtain RB(S,H,V). Next, the concordance of the black pixels of RB(S,H,V) of the modified image of the registered fingerprint to the black pixels of the modified image of the test fingerprint is checked.

(c) A check is conducted to determine the number of black pixels of a discordant section.

(d) This check is conducted when optionally selecting to check the sweat glands.

(e) In accordance with the above results, a final judgment is made with regard to the concordance of the registered fingerprint and the test fingerprint. Based on the outline of the above process, an example of a comparison procedure is shown by procedure C. The sub-template and the non-sub-template of the registered fingerprint, the modified image of the test fingerprint and the approximate center point of the test fingerprint serve as the input information of procedure C. The output information of procedure C is the comparison result.

(Procedure C)

Step C0

The maximum total range of displacement of the registered image information at the time of comparison is expressed as follows: interval $[S_{min}, S_{max}]$ represents the rotational angular direction; interval $[H_{min}, H_{max}]$ represents the horizontal direction; and interval $[V_{min}, V_{max}]$ represents the vertical direction. At least one of the intervals indicating the displacement direction is divided into one or more partial intervals as follows:

$S_{min} = \{S_{min}(Is); Is=1, 2, \ldots, Js\}$ $S_{max} = \{S_{max}(Is); Is=1, 2, \ldots, Js\}$ $H_{min} = \{H_{min}(Ih); Ih=1, 2, \ldots, Jh\}$ $H_{max} = \{H_{max}(Ih); Ih=1, 2, \ldots, Jh\}$ $V_{min} = \{V_{min}(Iv); Iv=1, 2, \ldots, Jv\}$ $V_{max} = \{V_{max}(Iv); Iv=1, 2, \ldots, Jv\}$ Interval $[S_{min}, S_{max}]$ is the aggregate sum of interval $[S_{min}(1), S_{max}(1)]$, interval $[S_{min}(2), S_{max}(2)]$, . . . , and interval $[S_{min}(Js), S_{max}(Js)]$.

Interval $[H_{min}, H_{max}]$ is the aggregate sum of interval $[H_{min}(1), H_{max}(1)]$, interval $[H_{min}(2), H_{max}(2)]$, . . . , and interval $[H_{min}(Jh), H_{max}(Jh)]$.

Interval $[V_{min}, V_{max}]$ is the aggregate sum of interval $[V_{min}(1), V_{max}(1)]$, interval $[V_{min}(2), V_{max}(2)]$, . . . , and interval $[V_{min}(Jv), V_{max}(Jv)]$.

Hereafter, from step C1, the selected partial alignment intervals are sequentially executed with regard to all {interval $[S_{min}(1), S_{max}(1)]$, interval $[S_{min}(2), S_{max}(2)]$, ..., and interval $[S_{min}(Js), S_{max}(Js)]$}, {interval $[H_{min}(1), H_{max}(1)]$, interval $[H_{min}(2), H_{max}(2)]$, ..., and interval $[H_{min}(Jh), H_{max}(Jh)]$}, and {interval $[V_{min}(1), V_{max}(1)]$, interval $[V_{min}(2), V_{max}(2)]$, ..., and interval $[V_{min}(Jv), V_{max}(Jv)]$}.

In a random alignment interval, the entire comparison procedure ends when a judgment of concordance is rendered, or when a judgment of discordance is rendered after abandoning the following comparison.

Step C1 (Comparison of the sub-template)

Steps C1a~C1d are executed.

Step C1a:

Sub template RT(0) is stored in memory 6 from the file. Subsequently, the following image concordance auxiliary procedure (procedure W) is executed using sub-template RT(0), $S=S_{min}(Is)~S_{max}(Is)$ (incremental value Ks of S), $H=H_{min}(Ih)~H_{max}(Ih)$ (incremental value Kh of H) and $V=V_{min}(Iv)~V_{max}(Iv)$ (incremental value Kv of V) wherein the registered information black pixel search incremental value Kr=Kra, (Kra≧1).

From this result, with regard to $S_{min}(Is)~S_{max}(IS)$, $H_{min}(Ih)~H_{max}(Ih)$, and $V_{min}(Iv)~V_{max}(Iv)$, the values of S, H and V are modified by incremental values Ks, Kh and Kv, respectively, and Sa, Ha, and Va (i.e. the quasi-optimal values of S, H, and V) are then calculated.

Step C1b:

With regard to the respective displacement ranges of S, H and V,

S: (Sa−Dsb)~(Sa+Dsb), incremental value Ksb

H: (Ha−Dhb)~(Ha+Dhb), incremental value Khb

V: (Va−Dvb)~(Va+Dvb), incremental value Kvb, procedure W is executed wherein the registered information black pixel search incremental value Kr=Krb (Krb≧1), and {Sb, Hb, Vb} (i.e., the quasi-optimal values of {S, H, V}) are calculated. Dsb, Dhb, and Dvb are constants for defining the displacement range (See C(1)).

Step C1c:

With regard to the respective displacement ranges of S, H and V,

S: (Sb−Dsc)~(Sb+Dsc), incremental value Ksb

H: (Hb−Dhc)~(Hb+Dhc), incremental value Khb

V: (Vb−Dvc)~(Vb+Dvc), incremental value Kvb, procedure W is executed wherein the registered information black pixel search incremental value Kr=Krc (Krc≧1), and (Sc, Hc, Vc) (i.e., the quasi-optimal values of {S, H, V}) are calculated. Dsc, Dhc, and Dvc are constants for defining the displacement range.

Step C1d:

Procedure W is executed according to S, H, V,

S=Sc, Dsd=0, incremental value Ksd=0

H=Hc, Dhd=0, incremental value Khd=0

V=Vc, Dvd=0, incremental value Kvd=0, wherein the registered information black pixel search incremental value Kr=Krd (Krd=1), and the optimal values {S, H, V} are calculated.

Dsd, Dhd, and Dvd are constants for defining the displacement range. From this result, each optimal value {S, H, V} wherein the degree of concordance T1 of the sub-template is maximized and the sub-template degree of concordance= $N_{1m}/N_{1c}$ are obtained. Next, for a predetermined number $T_{k1}$, if $T1 \geq T_{k1}$ the registered fingerprint and test fingerprint are judged to be concordant by means of the comparison of the sub-templates, and the procedure moves to step C2. On the other hand, if $T1 < T_{k1}$ the registered fingerprint and test fingerprint are judged to be discordant in the partial alignment interval undergoing processing, and the procedure moves to the processing of the subsequent partial alignment interval beginning with step C1. When a partial alignment interval for processing no longer exists, the registered fingerprint and test fingerprint are judged to be discordant, and procedure C terminates.

In addition, setting $T_{m1}$ equal to the maximum value of T1 in the partial alignment intervals from 1 to m, when $T_{m1} < T_{mk1(j)}$, due to the low probability of concordance, subsequent processing of the present partial alignment interval, as well as comparison processing of the remaining partial alignment intervals are not executed, the registered fingerprint and test fingerprint are judged to be discordant, and procedure C terminates. In order to execute the aforementioned judgment, $T_{mk1(j)}$ (j=1,2, ..., m) represents a previously determined constant.

Step C2 (Comparison of the non-sub-template and comparison of the template)

Using the optimal value {S, H, V} obtained from non-sub-template RB(0) and step C1 as input information, an auxiliary image concordance check procedure (procedure W) is carried-out. As a result, $N_{2m}$ and $N_{2c}$ are calculated, and the following is then obtained using the result of step C1:

Template degree of concordance $T2=(N_{1m}+N_{2m})/(N_{1c}+N_{2c})$ Next, for a predetermined constant $T_{k2}$, if $T2 \geq T_{k2}$ the registered fingerprint and the test fingerprint are judged to be concordant, and the procedure moves to step C3. On the other hand, if $T2 < T_{k2}$ the registered fingerprint and the test fingerprint are judged to be discordant in the partial alignment interval undergoing processing, and the procedure moves to the processing of the subsequent partial alignment interval beginning with step C1. When a partial alignment interval for processing no longer exists, the registered fingerprint and test fingerprint are judged to be discordant thereby resulting in the termination of procedure C.

Step C3 (Comparison of discordant sections)

In this step, the discordance of the black pixels of the registered fingerprint and the black pixels of the test fingerprint is checked. It is necessary to remove cases in which the number of black pixels in the discordant section of the image of the test fingerprint are too large. For this purpose, the following steps C3a~C3b are carried out to approximately obtain and judge the ratio of the black pixels of the discordant section at the point where the line width of the binary image of the test fingerprint has been aligned with the modified image of the registered fingerprint.

Step C3a:

The approximate range of the area of comparison of the modified image of the registered fingerprint of {S,H,V} is calculated from the ranges of RT(0) and RB(0). The coordinates (X',Y') in the region following modification of coordinates (X,Y) are calculated in the same manner as in procedure W, found by the following formulae:

$X' = (X - X_{RC}) \cdot \cos(S) + (Y - Y_{RC}) \cdot \sin(S) + X_{TC} - H$ $Y' = -(X - X_{RC}) \cdot \sin(S) + (Y - Y_{RC}) \cdot \cos(S) + Y_{TC} - V$ Note: cos(·) and sin(·) represent trigonometric functions.

Step C3b:

The number of black pixels $T_{nw}$ of the region of comparison following coordinate conversion of the modified image of the test fingerprint (i.e., sum aggregation of RT(S, H,V) and RB(S,H,V,)) is counted. In other words, $T_{nw}$=Total number of black pixels in the region of comparison following coordinate conversion of the test fingerprint image At this time, when the line width of the modified image of the test fingerprint is represented by w, the total number of black pixels $T_{nc}$ when this line width is set to the line width of the modified image of the registered fingerprint (line width λ) is given approximately by:

$T_{nc}=T_{nw}/(w/\lambda)$

When the line width of the modified image of the registered fingerprint reaches one pixel by means of thinning, it is possible to calculate the number of black pixels $T_{nw}$ of the region of comparison of the modified image of the test fingerprint by thinning this modified image of the test fingerprint. In this case, w=λ=1. In addition, the following has already been calculated:

$N_{1m}+N_{2m}$=Number of concordant black pixels within the region of comparison following coordinate conversion of the modified image of the test fingerprint and the modified image of the registered fingerprint $N_{1c}+N_{2c}$=Total number of black pixels within the region of comparison following coordinate conversion of the modified image of the registered fingerprint The degree of discordance Tz of the black pixels may, for example, be expressed as follows:

$Tz=(T_{nc}-N_{1m}-N_{2m})/(N_{1c}+N_{2c})$;

In the above case, when $|Tz| \leq T_{kc}$, with regard to the degree of discordance, the registered fingerprint and the test fingerprint are judged to be concordant; in the case where these conditions are not met, the registered fingerprint and the test fingerprint are judged to be discordant.

$T_{kc}$ ($0 \leq T_{kc} \leq 1$) is a constant indicating the allowable rate of discordant black pixels of the binary image of the test fingerprint; as this number decreases, the conditions become stricter (note: normally, $Tz \geq 0$, thus it is also possible to make the conditions stricter when $Tz \geq 0$ then when $Tz \geq 0$, by using different values for $T_{kc}$). When the registered fingerprint and the test fingerprint are judged to be discordant in the partial alignment interval undergoing processing, the procedure moves to the processing of the subsequent partial alignment interval beginning with step C1. When a partial alignment interval for processing no longer exists, the registered fingerprint and test fingerprint are judged to be discordant thereby resulting in the termination of procedure C.

Step C4 (Comparison of the sweat gland portions)

In the present step, in order to increase the accuracy of the comparison, it is possible to selectively add at least one of the following steps C4a and C4b.

Step C4a (Checking of holes from sweat glands):

The hole address modified using optimum value {S, H, V} is checked to determine the existence of a sweat gland in the addresses of the modified image of the test fingerprint (note: holes are formed by one or more white pixels in an image in which the ridge portions of a fingerprint are represented by black pixels following binary conversion). The size of the white pixel aggregation to be checked is represented by parameter constants. Subsequently, when, as a result of performing the following calculation, $T_{4a} \geq T_{k4a}$, the checking of the hole of a sweat gland is judged to be successful.

$T_{4a}$=(Number of concordant hole addresses)/(Total number of registered hole addresses)

Step C4b (Checking of non-holes):

The non-hole address modified using optimum value {S, H, V} is checked to determine the non-existence of a sweat gland in the addresses of the modified image of the test fingerprint. The size of the white pixel aggregation to be checked is represented by parameter constants. Subsequently, when, as a result of performing the following calculation, $T_{4b} \geq T_{k4b}$, the checking of a non-hole is judged to be successful.

$T_{4b}$=(Number of concordant non-hole addresses)/(Total number of registered non-hole addresses)

Note: $T_{k4b}$ is a threshold value constant.

Step C5 (Final judgment)

With regard to the processed partial alignment interval, when the sub-template concordance rate, template concordance rate, discordant section rate, and sweat gland check have been successfully completed, the registered fingerprint and the test fingerprint are judged to be concordant, thereby resulting in the termination of procedure C. However, when the registered fingerprint and the test fingerprint are judged to be discordant in the partial alignment interval undergoing processing, the procedure moves to the processing of the subsequent partial alignment interval beginning with step C1. When a partial alignment interval for processing no longer exists, the registered fingerprint and test fingerprint are judged to be discordant thereby resulting in the termination of procedure C.

(End of Procedure C)

Figure 13A:
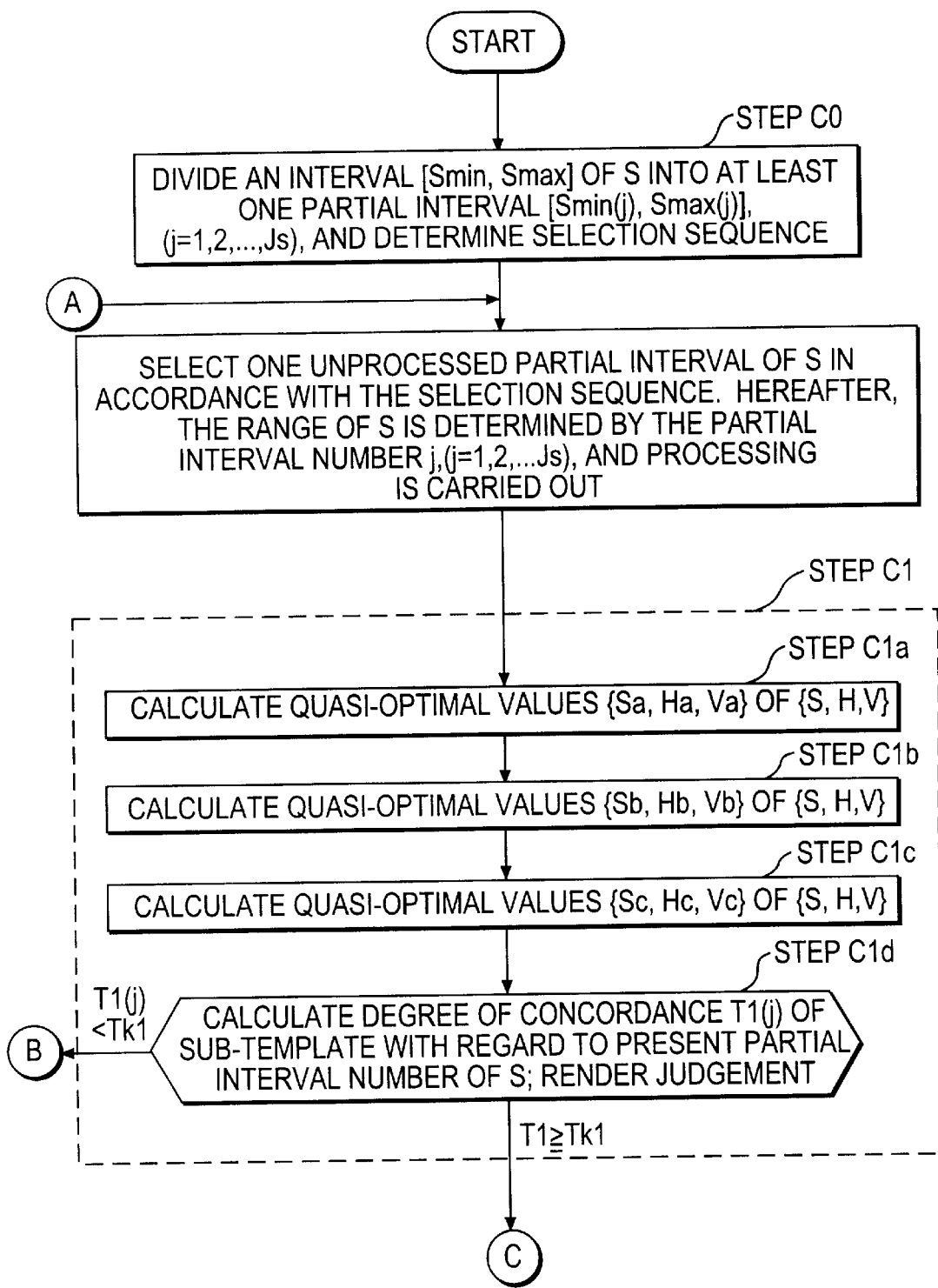
FIGS. 13A and 13B depict a flowchart showing an outline of a comparison process based on procedure C.
Figure 13B:
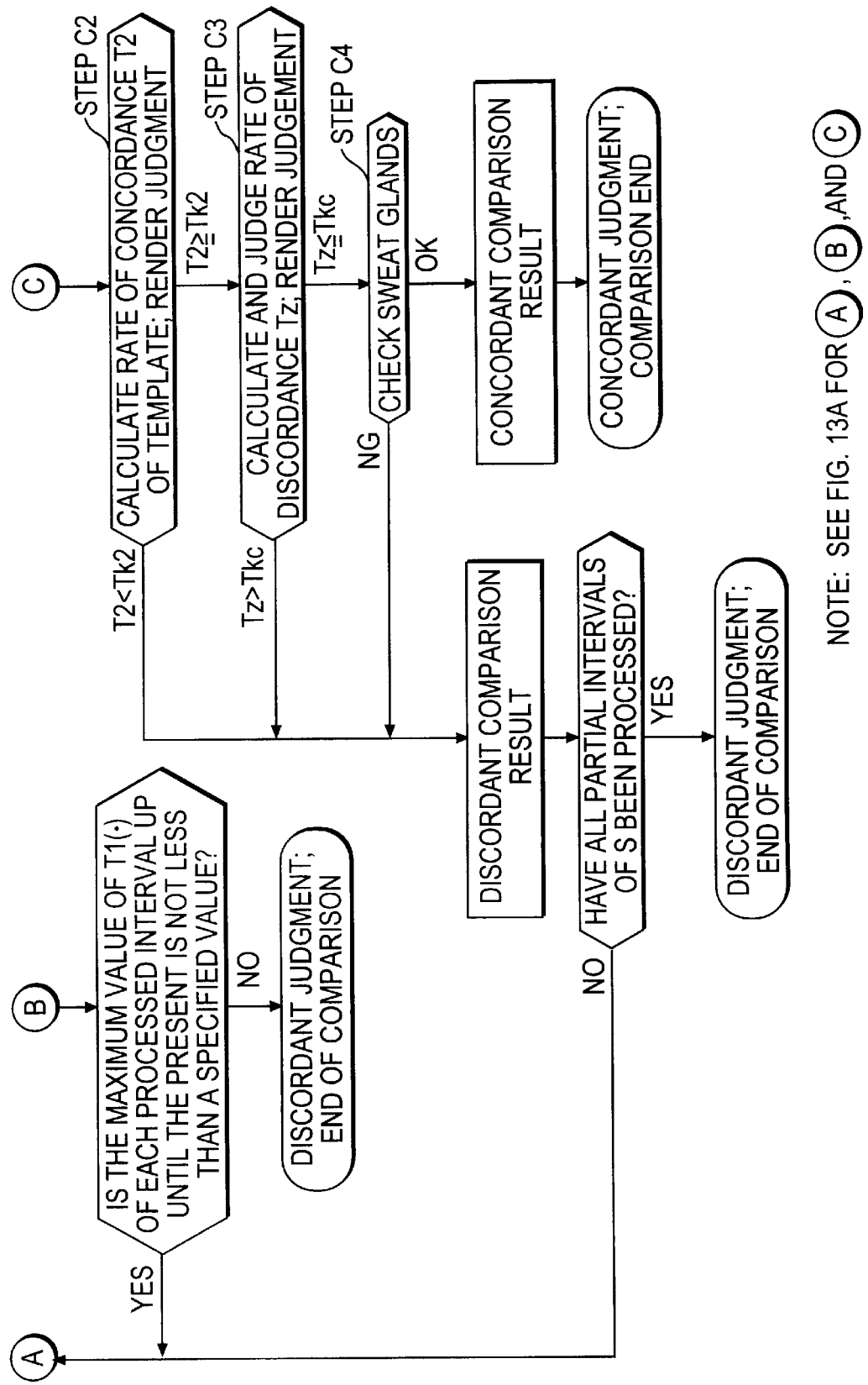

FIGS. 13A and 13B depict a flow diagram showing an outline example of the above comparison process based on procedure C. Furthermore, FIGS. 13A and 13B illustrate an example in which only an interval of an angular rotational direction S is divided to form partial alignment intervals.

Figure 14:
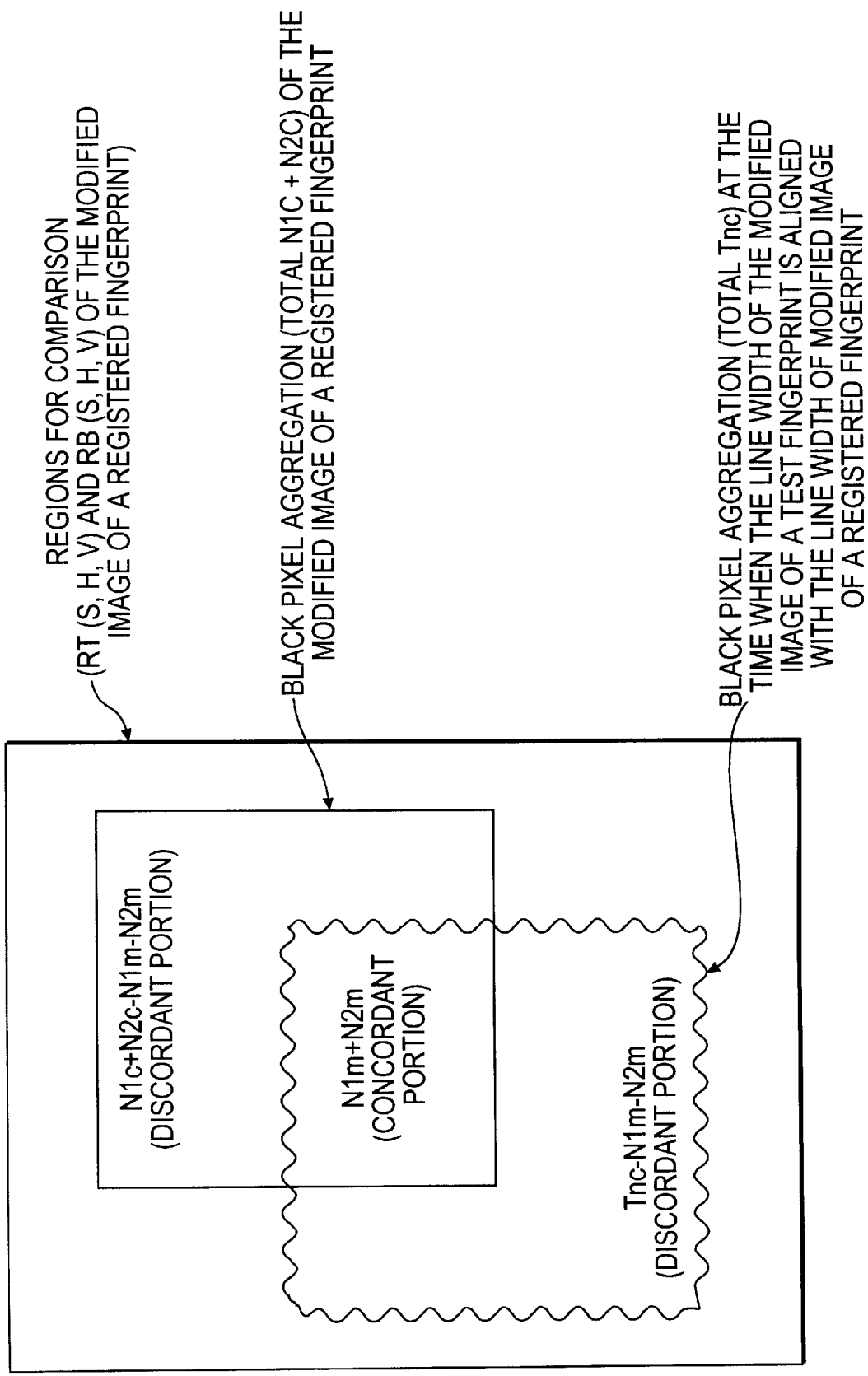
FIG. 14 is a diagram for use in explaining a method for checking discordant portions in a comparison process.

FIG. 14 is a diagram for explaining the checking of discordant sections in the aforementioned comparison process. This figure shows the relationship between concordant and discordant sections when the line width of the modified image of a test fingerprint is aligned with the line width of the modified image of a registered fingerprint.

Remarks C(1)

Each value of the incremental values (Ks, Kh, Kv), which represent the incremental widths of the primary displacement in step C1a, is checked as a rough value over a comparatively wide range. Each value of the incremental values (Ksb, Khb, Kvb), incorporating the quasi-optimal values of the {S,H,V} obtained in step C1a, which represent the incremental widths of the second displacement in step C1b, is checked as a precise value over a comparatively narrow range. In this manner, when the range of displacement during alignment is large, a greater reduction in the processing quantity can be achieved when compared to the case in which fine incremental values are used.

In step C1(a multi-stage process comprising 3 steps) of procedure C, the incremental value of each value of displacement can be increased to greater than 1 in the first and second steps; in the second and third steps, these values can be compared over the range defined by means of the line width in the prior step as the cardinal point of the quasi-optimal values of S, H, and V which were determined in the prior step; and it is possible to reduce the processing quantity of the comparison (approximately proportionate to the position matching search repetition) due to the fact that the number of black pixels of the registered image can be limited through a skipping procedure which skips a fixed number of the black pixels of the registered information in accordance with setting the registered information black pixel search width increment Kr to a value of 2 or greater. The maximum and minimum values of each displacement range ($S_{min}$, $S_{max}$, $H_{min}$, $H_{max}$, $V_{min}$, $V_{max}$) are defined according to the maximum permissible displacement ranges at the time of fingerprint input. Step C1d is for the purpose of determining T1 in step C1.

The following characteristics are present. (1) The number of search repetitions increases with increasing displacement range; (2) The number of search repetitions increases with decreasing incremental value; (3) The incremental value at a midway step is defined by taking into consideration the incremental width of the immediately preceding or immediately succeeding step; (4) For steps other than the final step, a skip search is possible; (5) When the designation of the translation limits, the incremental value and the jump search is not appropriate, errors in recognition occurs easily.

In step C3b, the degree of discordance sections is calculated by approximately setting the line width of the modified image of the test fingerprint to the line width of the modified image of the registered fingerprint. However, it is also possible to calculate the rate of discordant sections by approximately setting the line width of the modified image of the registered fingerprint to the line width of the modified image of the test fingerprint.

(13) Auxiliary Procedure for Checking Image Concordance

A summary of an auxiliary procedure (Procedure W) for conducting a check on the concordance of two images is explained in the following. The approximate center point ($X_{RC}$, $Y_{RC}$) for each pixel address ($X_R$, $Y_R$) of the sub-template RT(0) or non-sub-template RB(0) of the registered fingerprint undergoes parallel displacement so as to become concordant to the approximate center point ($X_{TC}$, $Y_{TC}$) of the test fingerprint. Next, the coordinate axis of the registered fingerprint is rotated, the black pixel ($X_{R@}$, $Y_{R@}$) address following conversion is checked as to whether or not any black pixels exist within the fingerprint area of the modified image of the test fingerprint, and parallel displacement is again carried out.

In the case of RT(S,H,V), S, H and V, and T1, $N_{1m}$ and $N_{1c}$ are calculated for the time when the degree of concordance T1 reaches a maximum for each value of S, H and V. With regard to RB(S,H,V), S, H, and V each respectively represent only one case. Additionally, in procedure W, T1 and T2, $N_{1m}$ and $N_{2m}$, and $N_{1c}$ and $N_{2c}$ are referred to as "T", "Nm", and "Nc", respectively.

The aggregation of black pixel addresses of a specified portion of the modified image of the registered fingerprint (either RT(0) or RB(0)), angular conversion quantity S of the coordinate axis (minimum value, maximum value, incremental value), horizontal displacement H of the coordinate axis of the registered fingerprint (minimum value, maximum value, incremental value), vertical displacement V of the coordinate axis of the registered fingerprint (minimum value, maximum value, incremental value), the modified image of the test fingerprint and the skip count J based on the skip search of the black pixels of the registered fingerprint serve as the input information of procedure W. The displacement range is the entire interval or partial interval.

When comparing the black pixels of the registered fingerprint with those of the test fingerprint, the registered information black pixel search incremental value Kr designates the increment by which the black pixels of the modified image of the registered fingerprint are searched. For example, when Kr=1 all of the black pixels of the modified image of the registered fingerprint are searched, and when Kr=2, every other black pixel of the registered fingerprint is searched.

The optimal angular degree of rotation S about the coordinate axis for the registered fingerprint, the optimal coordinate axial horizontal displacement quantity H, the optimal coordinate axial vertical displacement quantity V, the number of concordant black pixels $N_m$ of the modified image of the test fingerprint and the modified image of the registered fingerprint in the specified region (either RT(0) or RB(0)), the total number of black pixels $N_c$ of the modified image of the registered fingerprint of the specified region and the degree of concordance T.

Figure 15:
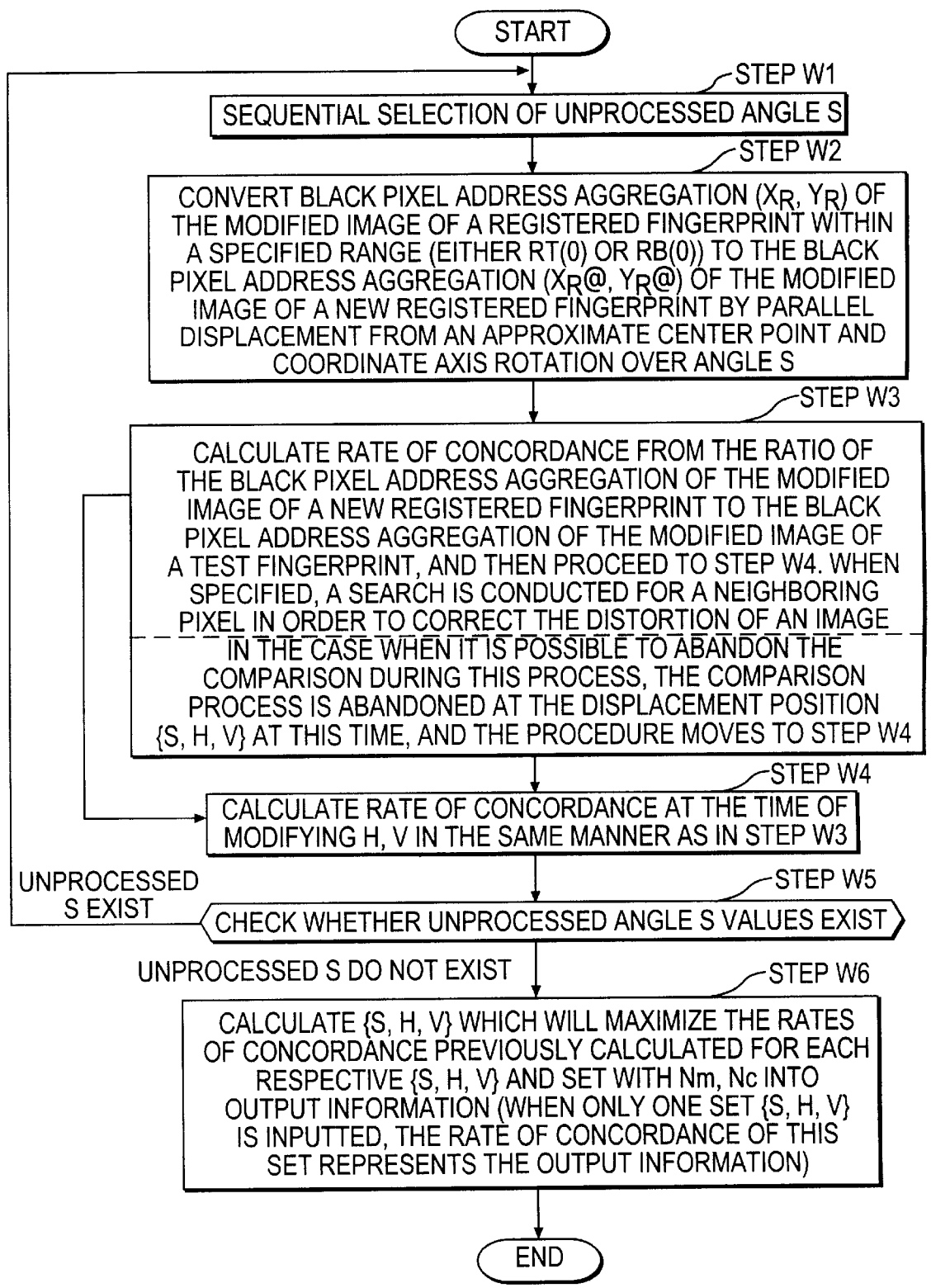
FIG. 15 is a flowchart showing an outline of an auxiliary procedure (procedure W) for checking the concordance of images in a comparison process.

FIG. 15 is a flow diagram showing an outline of the auxiliary procedure for checking image concordance (Procedure W) in the comparison process. An example of the processing of procedure W is explained in the following.
(Procedure W)
Step W1 (Selection of angle S)

Depending on the input information of angle S, with regard to the designated interval, S is sequentially selected by means of the incremental value of S from the minimum value of S to the maximum value of S (i.e., the minimum value of S is $S_{min}$, the maximum value of S is $S_{max}$, and when the incremental value is Ks, S varies from $S_{min}$ to $S_{max}$ according to S=$S_{min}$(Is), $S_{min}$(Is)+Ks, ..., $S_{max}$), following which the procedure moves to step W2.
Step W2 (Coordinate conversion according to angle S)

With regard to the black pixels of the modified image of the inputted registered fingerprint (either RT(0) or RB(0)), and with respect to the black pixel address ($X_R$, $Y_R$) which is to be searched using the registered information black pixel search incremental value Kr,
(a) when S=0, $X_{R@}=X_R-X_{RC}+X_{TC}$ $Y_{R@}=Y_R-Y_{RC}+Y_{TC}$ are set.
(b) when S≠0, Following parallel displacement to align the approximate center point ($X_{RC}$, $Y_{RC}$) of the registered fingerprint to the approximate center point of the test fingerprint ($X_{TC}$, $Y_{TC}$), coordinate axis rotation over an angle S° is performed with respect to all of the black pixel addresses ($X_R$, $Y_R$) of a black pixel aggregation of the modified image of an inputted registered fingerprint (either RT(0) or RB(0)). This is carried out according to, $X_{R@}=(X_R-X_{RC})\cdot\cos(S)+(Y_R-Y_{RC})\cdot\sin(S)+X_{TC}$ $YR_@=-(X_R-X_{RC})\cdot\sin(S)+(Y_R-Y_{RC})\cdot\cos(S)+Y_{TC}$ Accordingly, an aggregation of all black pixel addresses ($X_{R@}$, $Y_{R@}$) of the new registered fingerprint at the time when H=V=0 is calculated.

According to the above, the approximate center ($X_{RC}$, $Y_{RC}$) of the registered fingerprint is rotated S degrees about the coordinate axis of the registered fingerprint and an aggregation of all black pixel addresses ($X_{R@}$, $Y_{R@}$) of the new registered fingerprint is obtained when:

Horizontal displacement H=Vertical displacement V=0
Step W3 (Calculation of the degree of concordance T)
Step W3a:

Initially, the counter for the number of concordant black pixels $N_m$ and the counter for the total number of black pixels $N_c$ of the modified image of the registered fingerprint are respectively reset to "0".

Step W3b:

For each address of the aggregation of ($X_{R@}$, $Y_{R@}$), the modified image of the test fingerprint is checked while applying the following:

(a) If the aggregation consists of black pixels within the fingerprint area, "1" is added to the counter for the number of concordant black pixels $N_m$, and "1" is also added to the counter for the total number of black pixels $N_c$ of the registered fingerprint.

(b) If the aggregation consists of white pixels within the fingerprint area, or if the aggregation lies outside the fingerprint area (treated as neither white nor black), "1" is added to the counter for the total number of black pixels $N_c$ of the registered fingerprint.

At this point, a check is performed to determine whether or not the abandonment of the comparison is possible for {S,H,V} in the comparison processing of the sub-template.

In other words, since the registered fingerprint information to be checked is an aggregation of black addresses, this information is classified into k continuous intervals according to the search sequence; at the end of each interval i (i=1, 2, . . . , k), when counter $N_c = N_{ci}$, the $N_m$ at this time is set to $N_{mi}$ (i=1,2, . . . k), and the degree of concordance up to that point of the pattern defined according to the values of S, H and V, is represented by $N_{mi}/N_{ci}$ and thus, with regard to a constant Tci (i=1,2, . . . , k), in the case when $N_{mi}/N_{ci} < T_{ci}$, (i=1,2 . . . k), ($T_{ci}$ and k are constants. See Remarks W(1).)

even if a subsequent check is conducted, there will not be a significant degree of concordance obtained at the current values of S, H, and V, hence the current S, H, and V values at this point are discarded, and the procedure moves to step W4 in order to advance to the subsequent S, H, and V values.

The following process (neighboring pixel search at the time of comparison) can be selectively performed (This neighboring pixel search process can be selectively applied at each processing stage of the sub-template RT, and/or at the stage of the non-sub-template RB.).

The case when the black pixel of the modified image of the registered fingerprint of an optional address (e.g., address A) within the image corresponds to the black pixel of address A of the modified image of the test fingerprint, is referred to as "concordance" or "true concordance" with regard to the pixel.

When the black pixel of the modified image of the registered fingerprint of an optional address (e.g., address A) within the image corresponds to a white pixel of the same address A of the modified image of the test fingerprint, the neighboring addresses of address A of the modified image of the test fingerprint are checked for the presence of black pixel. When at least one black pixel is present, the black pixel of the modified image of the registered fingerprint of address A is judged to be concordant with the black pixel of the modified image of the test fingerprint (when it is necessary to distinguish such concordance from true concordance, such concordance is referred to as "approximate concordance"). At this time, during comparison of the black pixel of the modified image of the registered fingerprint, it is designed such that the approximately concordant black pixels, as well as the concordant black pixels of the modified image of the test fingerprint are not used for comparison more than once. In order to achieve this result, the following operations are conducted.

The modified image of the test fingerprint is placed into the working area of memory. With regard to the black pixels of the modified image of the test fingerprint which have been judged to be concordant with the black pixels of the modified image of the registered fingerprint by means of either true or approximate concordance, the pixel value of image memory is converted into an intermediate value other than the brightness value of a black or white pixel (e.g., when the brightness of a black pixel and white pixel are "0" and "255", respectively, the brightness of true concordance is Ba (e.g., a value other than that of a black pixel or white pixel, such as "50"), and the brightness of approximate concordance is Bb (e.g., "100")). In the comparison of the black pixel of the modified image of the test fingerprint and the black pixel of the modified image of the registered fingerprint, repeated comparison of concordant and approximately concordant black pixels of the test fingerprint of addresses within the same image is prevented since previously compared pixel values are converted to intermediate values in image memory (i.e., the intermediate values of previously compared image memories are checked). When the comparison of the modified image of the test fingerprint and the modified image of the registered fingerprint using one set of values {S, H, V} is completed, the modified image of the test fingerprint is returned to its original state using the information placed into the working area of memory.

Step W3c:

When step W3b has been completed for all of the addresses of the aggregations of $(X_{R@}, Y_{R@})$, $T = N_m/N_c$ is calculated, and $N_m$, $N_c$ and T for this {S,H,V} are memory stored.

Step W4 (Parallel displacement according to H and V)

For the black pixel address $(X_@, Y_@)$ of the new registered fingerprint when H=V=0, H and V, which have been set in the H, V storage area are selected in sequence (when H=V=0, calculation has already been completed in step 3). When the values of H from its minimum value to its maximum value and the values of V from its minimum value to its maximum value are changed sequentially by each increment (i.e., the minimum value of H is $H_{min}$, the maximum is $H_{max}$, when the incremental value is Kh, the value of H changes according to H $=H_{min}(Ih)$, $H_{min}(Ih)+Kh$, . . . until the maximum $K_{max}$ is reached; the minimum value of V is $V_{min}$, the maximum is $V_{max}$, when the incremental value is Kh, the value of H changes according to V=$V_{min}$, $V_{min}+Kv$, . . . ), $(X_@-H, Y_@-V)$ becomes the black pixel address aggregation of the new registered fingerprint following parallel displacement, hence processing identical to step W3 is carried out for each set of {S,H,V}.

Step W5 (Check of unprocessed S)

When a value of an unprocessed S is present, the procedure returns to step W1; When a value of an unprocessed S is not present, the procedure moves to step W6.

Step W6 (Judgment of the maximum degree of concordance)

For each {S,H,V}, according to each value of S and each {S,H,V} according to the change in H=$H_{min} \sim H_{max}$, V=$V_{min} \sim V_{max}$, the values of S, H, and V, and the values of T, $N_m$ and $N_c$ are calculated as the output information for the case when T=$N_m/N_c$ reaches a maximum. Even when only one value for each of S, H, and V, respectively, is inputted, T, $N_m$ and $N_c$ are designated as the output information.

(End of procedure W)

Figure 16B:
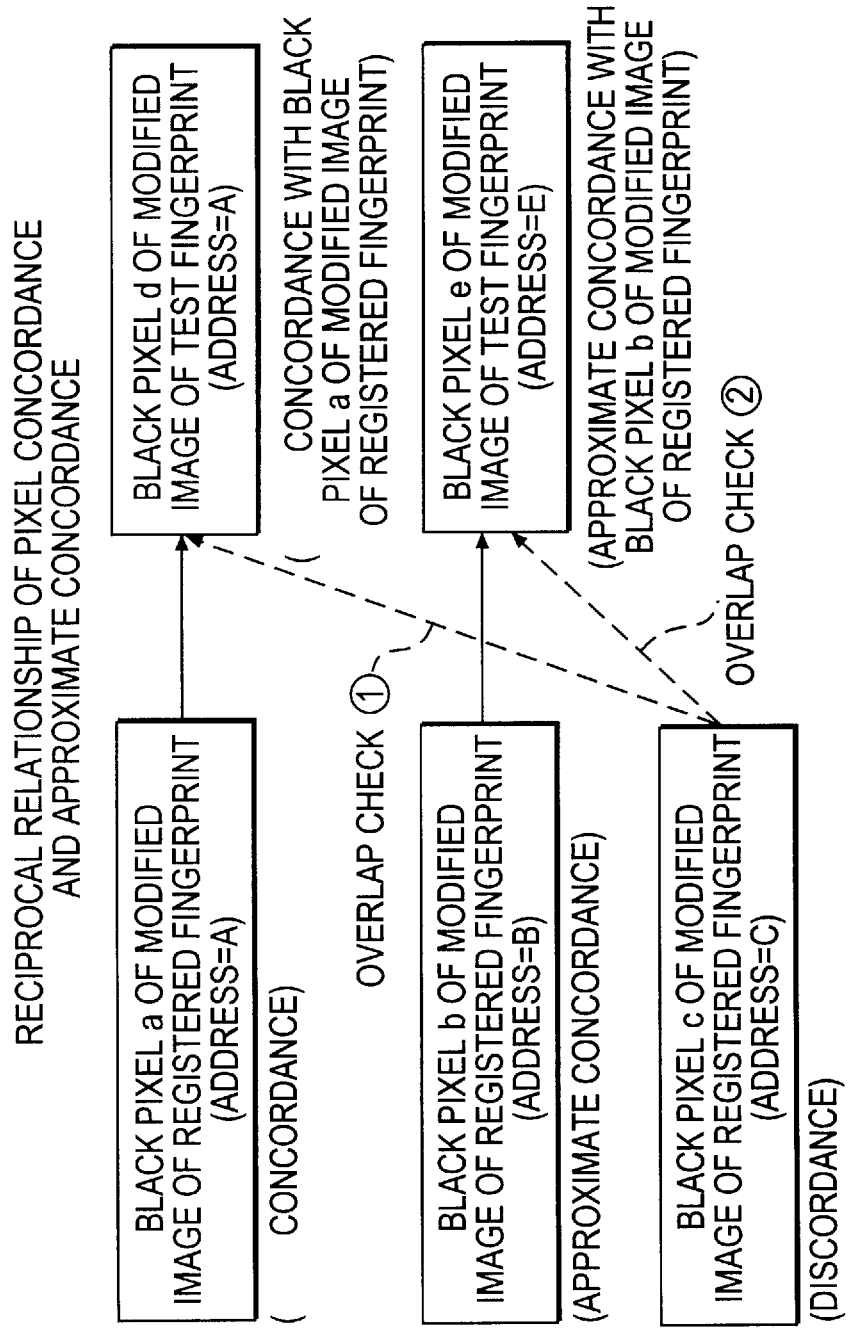
FIG. 16B is a flowchart of the reciprocal relationship of concordance and approximate concordance.

FIG. 16A is a diagram for explaining an example of the neighboring pixel search in the comparison process. FIG. 16B, with regard to the black pixel address A of the registered information from a registered fingerprint, shows cases: (1) when address A of the modified image of the test fingerprint is a black pixel, address A of the modified image of the test fingerprint and address A of the modified image of the registered fingerprint are totally concordant; and (2) when address A of the modified image of the test fingerprint is not a black pixel, e.g., when address B of the modified image of the test fingerprint is a black pixel, address A of the modified image of the test fingerprint and address A of the modified image of the registered fingerprint are approximately concordant. In addition, FIG. 16B shows the reciprocal relationship of concordance and approximate concordance; an overlap check is performed in order to prevent the overlap of black pixel of the modified image of the test fingerprint, which has already been compared once as truly or approximately concordant, from the black pixel address of the modified image of another registered fingerprint.

In other words, black pixel a of the modified image of the registered fingerprint is totally concordant with black pixel d of the modified image of the test fingerprint; black pixel b of the modified image of the registered fingerprint is approximately concordant with black pixel e of the modified image of the test fingerprint; and black pixel c of the modified image of the registered fingerprint is discordant with the modified image of the test fingerprint. When checks for total concordance and approximate concordance are performed, it is designed such that neither black pixel d nor black pixel e, both of which have already been compared, is overlapped and designated again as concordant.

Furthermore, it is possible to designate the search range for judging approximate concordance by considering four or eight neighboring pixels, taking into consideration the distortion state of the image at input, etc.

Remarks W(1)

The value of $T_{ci}$ (i=1,2, ... k) in step W3b is $0 \leq T_{ci} \leq 1$, however it is possible to determine this value, for example, as described in the following. When total number of black pixels of a modified image of a registered fingerprint is set to $N_c$, $N_{ci}/N_c$ (i=1,2, ... k) indicates the progression state of the processing wherein the range is represented by $0 \leq N_{ci}/N_c \leq 1$. As Nci increases and approaches $N_c$, $N_{mi}/N_{ci}$ approaches $N_m/N_c$, which is the degree of concordance with respect to the {S,H,V} currently being checked, thus it is possible to set $T_{ci}$ such that $N_{ci}$ is as large as possible.

As $T_{ci}$ increases, the range for midway abandonment also increases. There is a considerable effect on the decrease in the processing amount, however, due to the frequency with which errors in recognition are generated, it is necessary to set an appropriate value for $T_{ci}$. The maximum frequency of this calculation is determined according to the set value of k. If midway abandonment of a comparison is carried out one time, the calculation for the possibility of midway abandonment for the values of {S,H,V} after that point is not necessary. In addition, it is necessary to set a concrete value of $T_{ci}$ according to the characteristics of the desired image. Furthermore, if the condition expression defining the range of the midway abandonment of the comparison also defines the degree of concordance up to that point; this condition expression is not limited to the example shown in procedure W.

Remarks W(2)

The method of step W2 signifies the following. For all the addresses $(X_R, Y_R)$ in step W2, the new address following parallel displacement to align the approximate center point $(X_{RC}, Y_{RC})$ of the registered fingerprint concordant to the approximate center point $(X_{TC}, Y_{TC})$ of the test fingerprint is as follows:

$X_{R\#} = X_R - (X_{RC} - X_{TC})$ $Y_{R\#} = Y_R - (Y_{RC} - Y_{TC})$ $(X_{R\#}, Y_{R\#})$ then forms the new address. Subsequently, coordinate axis rotation of S degrees is carried out about $(X_{TC}, Y_{TC})$. This may be obtained according to the following:

$$X_{R@} = (X_{R\#} - X_{TC}) \cdot \cos(S) + (Y_{R\#} - Y_{TC}) \cdot \sin(S) + X_{TC}$$
$$= (X_R - X_{RC}) \cdot \cos(S) + (Y_R - Y_{RC}) \cdot \sin(S) + X_{TC}$$
$$Y_{R@} = -(X_{R\#} - X_{TC}) \cdot \sin(S) + (Y_{R\#} - Y_{TC}) \cdot \cos(S) + Y_{TC}$$
$$= -(X_R - X_{RC}) \cdot \sin(S) + (Y_R - Y_{RC}) \cdot \cos(S) + Y_{TC}$$

(It is possible to maintain the values of the variable range of the predetermined angle S by means of the values of the $\sin(\cdot)$ and $\cos(\cdot)$ trigonometric functions.)

(14) Flow of Registration Processing and Comparison Processing

Figure 17:
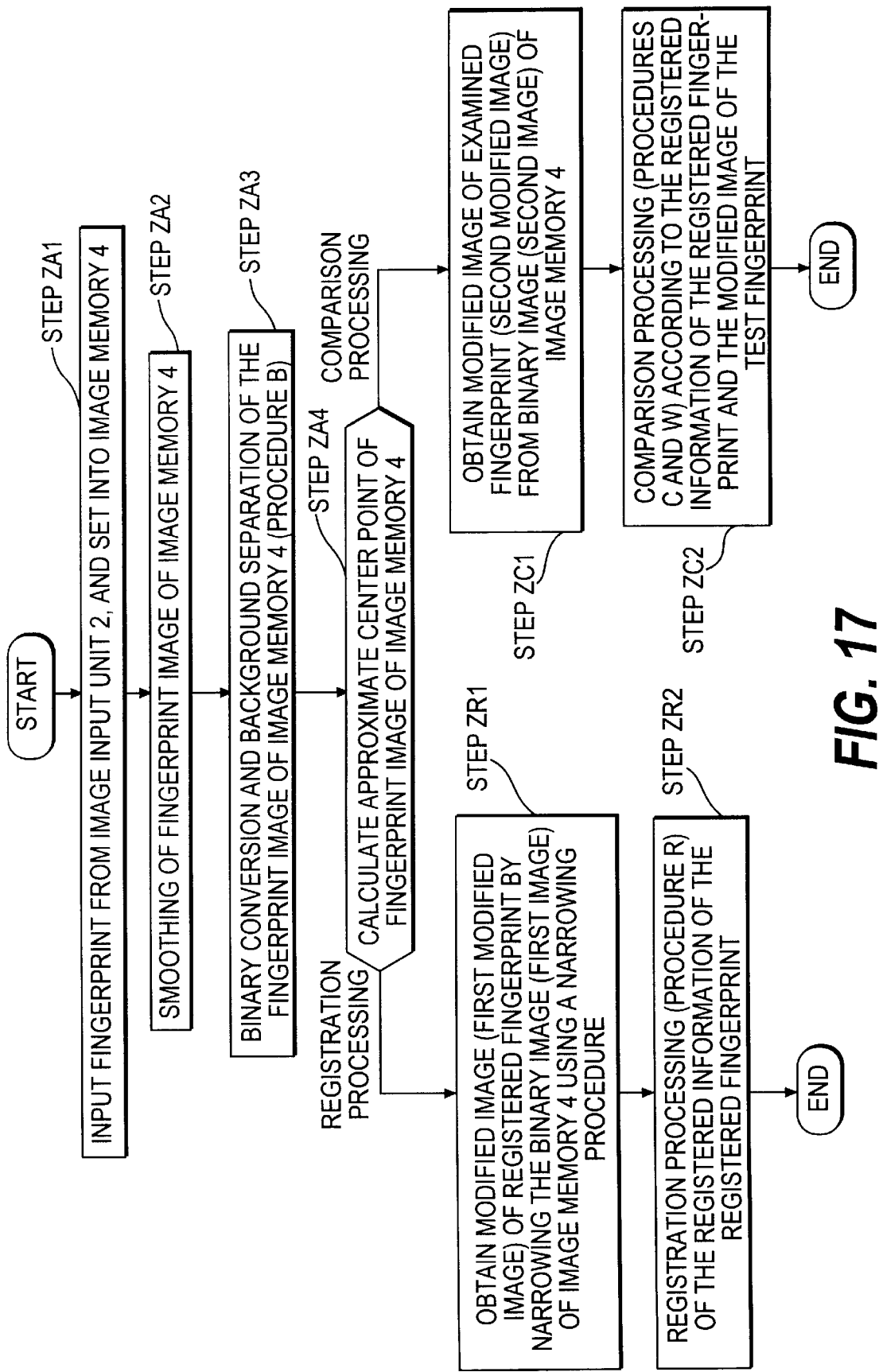
FIG. 17 is a flowchart showing an outline of the fingerprint registration and comparison processes.

FIG. 17 is a flow diagram showing an outline of the registration processing and the comparison processing of a fingerprint. The registration process is the process of registering the registration information of a fingerprint in memory 6 of image processing unit 1. The comparison process is the process of judging the concordance of a test fingerprint and a registered fingerprint. A flow chart outline from input of the fingerprint up until the registration or comparison process is shown in the following procedure Z.

(Procedure Z)

Steps ZA1~ZA5 represent the processes common to both the registration processing and comparison processing.

Step ZA1

Input of a fingerprint from image input device 2 into image memory 4.

Step ZA2

Smoothing of the gray-scale image of the fingerprint in image 10 of image memory 4.

Step ZA3

Binary conversion and background segregation of image 10 by means of procedure B.

Step ZA4

Calculation of the approximate center point of the fingerprint image in image 10.

(End of steps ZA1~ZA4)

The following processes are separated into registration processing and comparison processing.

Steps ZR1~ZR2 are applied during the registration process; these steps record the registered information of the registered fingerprint into memory 6.

Step ZR1

Narrow processing within the fingerprint area is carried out on the binary image (primary image) of the registered image in image 10, and a modified image of the registered fingerprint (primary modified image) is obtained.

Step ZR2

The processing of registered information of the registered fingerprint is carried out (procedure R).

(End of steps ZR1~ZR2)

Steps ZC1~ZC2 are applied during the comparison process; these steps perform the comparison of the test fingerprint and the registered fingerprint.

Step ZC1

Black pixel ratio standardization or narrowing of the fingerprint area of the binary image of the test fingerprint (secondary image) in image 10 is performed, and a modified image of the test fingerprint (secondary modified image) is obtained. It is not necessary to repeat standardization of the black pixel ratio in the case when this process has been performed in step ZA3.

Step ZC2

Judgment is made on the concordance of the registered fingerprint and the test fingerprint by means of the aforementioned comparison processes (procedure C, procedure W).

(End of steps ZC1~ZC2)

Figure 18:
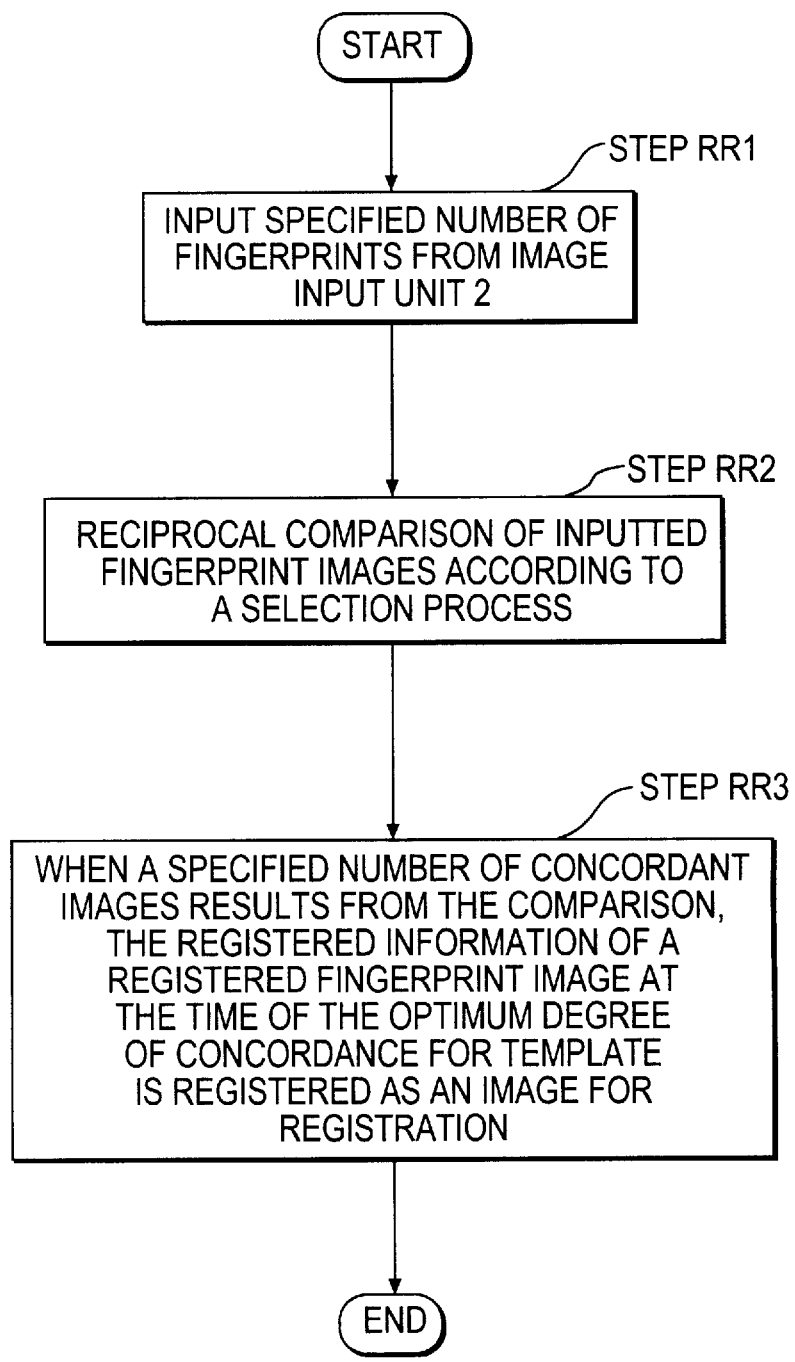
FIG. 18 is a flowchart showing an outline of a registration process wherein the optimum registered fingerprint from among a plurality of input images is selected.

In the registration processing of the image, a plurality of images can be sequentially inputted and maintained. These images are then compared, and the image with the best concordance can be selected as the image for registration. FIG. 18 is a flow diagram showing an outline of this registration process by means of which the optimum registered fingerprint is selected from among a plurality of input images. An example of this procedure is shown by procedure RR.

(Procedure RR)

Step RR1

The fingerprint image is inputted into image memory, and the inputted fingerprint image is stored in a file. This operations is repeated a specified number of times (note: In this example, this specified number is 3 times; the files containing the fingerprint images are designated, for example, z1, z2 and z3.).

Step RR2

With regard to the plurality of inputted images, a comparison process is conducted in accordance with the following combinations; when concordance is detected, the degree of concordance T2 of each template is recorded into memory.

During this comparison process, at the time when a comparison discordance is generated, the registration process is abandoned, and the procedure is re-executed from step RR1.

When the comparison of registered fingerprint z1 and test fingerprint z2 results in a final judgment of concordance, the degree of concordance T2 of the template is calculated and set as $Q_{12}$.

When the comparison of registered fingerprint z1 and test fingerprint z3 results in a final judgment of concordance, the degree of concordance T2 of the template is calculated and set as $Q_{13}$.

When the comparison of registered fingerprint z2 and test fingerprint z1 results in a final judgment of concordance, the degree of concordance T2 of the template is calculated and set as $Q_{21}$.

When the comparison of registered fingerprint z2 and test fingerprint z3 results in a final judgment of concordance, the degree of concordance T2 of the template is calculated and set as $Q_{23}$.

When the comparison of registered fingerprint z3 and test fingerprint z1 results in a final judgment of concordance, the degree of concordance T2 of the template is calculated and set as $Q_{31}$.

When the comparison of registered fingerprint z3 and test fingerprint z2 results in a final judgment of concordance, the degree of concordance T2 of the template is calculated and set as $Q_{32}$.

The number of final judgments of concordance must meet specified conditions (e.g., when the comparison process is conducted six times, as described above, specified conditions requiring, for example, at least four final judgments of concordance may be designated.).

Subsequently, the average degree of concordance is calculated for each input image. For example, in the case when all of the aforementioned comparisons are concordant, for z1, average degree of concordance $Q1=(Q_{12}+Q_{13})/2$;

for z2, average degree of concordance $Q2=(Q_{21}+Q_{23})/2$; and for z3, average degree of concordance $Q3=(Q_{31}+Q_{32})/2$.

Step RR3

The maximum Qi is calculated from among the average degrees of concordance Qi={Q1, Q2, Q3}, and is registered using the registration information of fingerprint zi corresponding to the i above.

(End of procedure RR)

The number of input images at the time of registering one fingerprint may be an optionally designated value of at least one. Increasing the number of input images increases the possibility of selecting a high quality image as the registered fingerprint image, however, this also results in an increase in the registration processing amount, thus the number of input images is determined by considering a balance between these aspects. The selection of combinations for the comparison of reciprocal regions of the input images is not limited to the above description, as it is also possible to select only a portion of the aforementioned combinations as well. The process for selecting the fingerprint images for registration is also not limited to the aforementioned use of the average degrees of concordance, as other methods are also possible.

(15) Comparison of 1 to N

The comparison process described in the aforementioned embodiments judges whether or not one test fingerprint is concordant with the registered information of one registered fingerprint. Using this comparison process, in order to judge whether or not one test fingerprint is concordant with at least one registered information from among an optional number of registered information, it is clear that the comparison process must be sequentially performed with regard to each registered information until a judgment of concordance results. However, a drawback exists in this process in that increasing the number of registered information results in an increase in the processing amount for comparison.

Figure 19A:
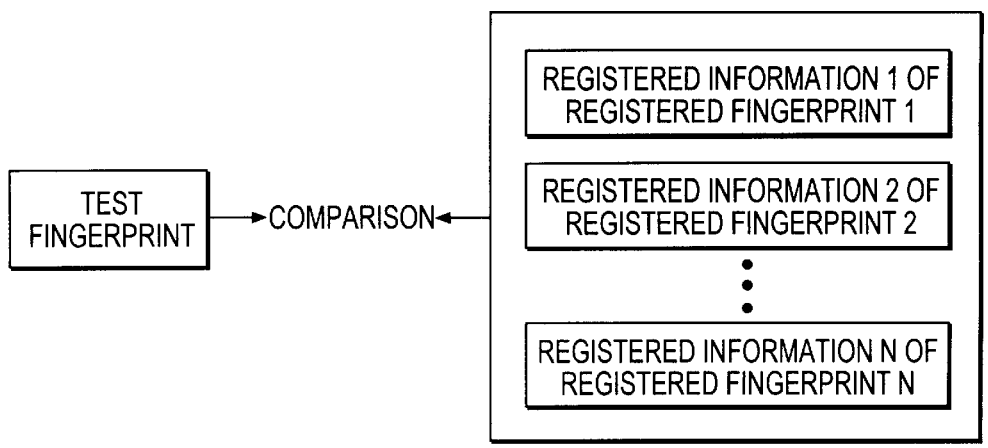
FIG. 19A is a diagram showing a comparison relationship between one test fingerprint and N registered fingerprints.
Figure 19B:
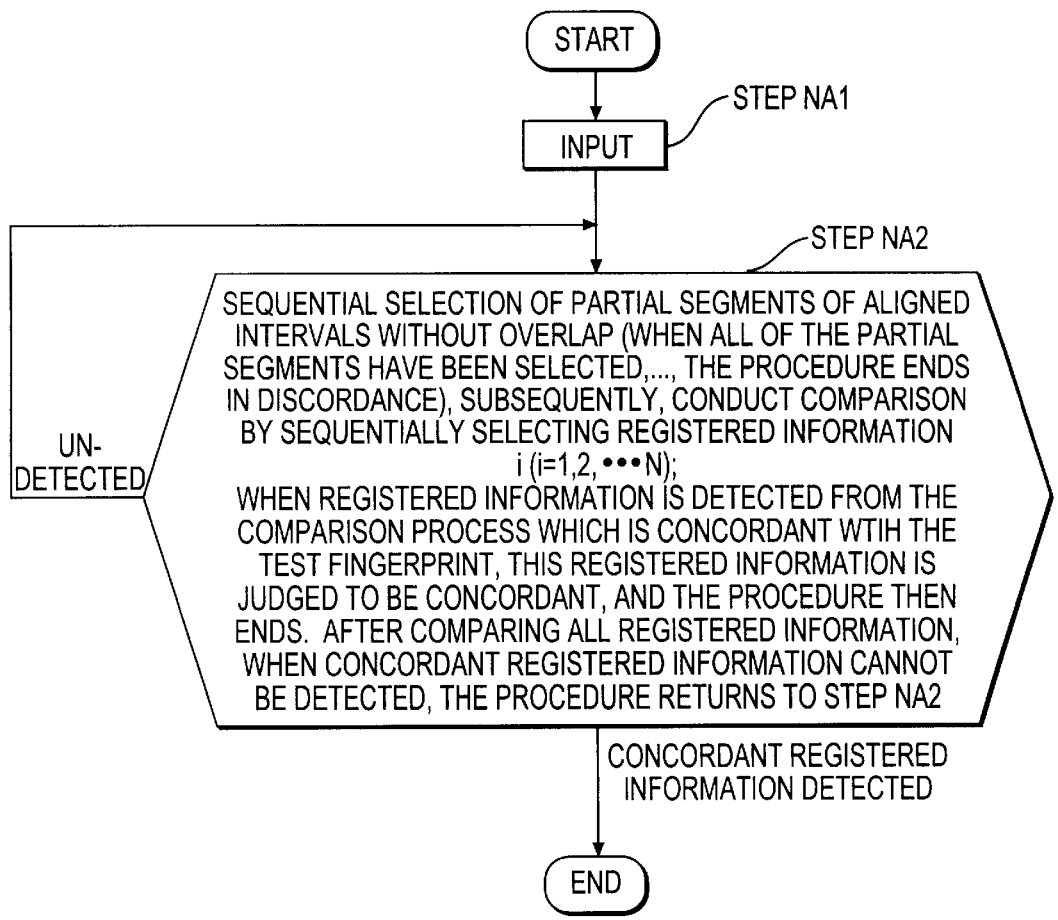
FIG. 19B is a flowchart of the comparison of the one test fingerprint against the N registered fingerprints shown in FIG. 19A.

From among an optional number of registered information, when one registered information which is concordant with one test fingerprint is discovered, the following procedure NA can be executed. FIG. 19A shows the relationship between the test fingerprint and registered fingerprint; FIG. 19B is a flow diagram showing an outline of this aforementioned 1 to N comparison process.

[Procedure NA]

The partial interval of {S,H,V} is divided into first, second, . . . , nth partial segments. The original segment {S,H,V} is accordingly the aggregate sum of all partial segments. The partial segments may be provided independently from the partial alignment intervals, or optionally may utilize the partial alignment intervals. A simple example of a partial segment includes selecting a segment in which concordance occurs frequently (e.g., {S=0, H=$H_{min}$~$H_{max}$, V=$V_{min}$~$V_{max}$} as the first partial segment, and then selecting a partial segment other than this first partial segment.

(Procedure NA)

Step NA1

Input of test fingerprint.

Step NA2

Sequential selection of partial segments.

In the comparison of the first partial segment, the comparison of a test fingerprint with registered information (i=1, 2, . . . , n) is performed with respect to the first segment {S,H,V} until concordant registered information is discovered. When it is not possible to find concordant registered information among the registered information processed in the first comparison, the procedure proceeds to the second comparison.

In the comparison of the second partial segment, the comparison of a test fingerprint with registered information (i=1, 2, . . . , n) is performed with respect to the second segment {S,H,V} until concordant registered information is discovered. When it is not possible to find concordant registered information among the registered information processed in the second comparison, the procedure proceeds to the third comparison.

This comparison procedure continues, as described above, until a concordant registered fingerprint image is discovered. The procedure ends when a concordant registered fingerprint image is discovered. In the case when a concordant registered fingerprint image cannot be found, the procedure ends after processing the last partial segment. (End of procedure NA) With regard to the test fingerprint and concordant registered information, according to this above-described procedure, the processing amount for comparison up until the discovery of concordant registered information can be significantly reduced.

(16) Substitution of the degree of discordance

During the comparison process, it is possible to use the following process in place of judging the aforementioned degree of discordance.

When comparing a binary image for registration and a binary image for testing (binary test image), the registration information of the aforementioned binary image for the registration, and the image of the registration information in which the black/white pixels of the aforementioned binary image for the registration have been reversed (reverse registered image) are separately registered; the concordance of the binary test image and the registered information are compared; and the concordance of the reverse image of the binary test image and the reverse registered image of the registered information are compared. When the final judgments of the aforementioned two comparisons both indicate concordance, the binary image for registration and the binary test image are judged to be concordant, and the check using the degree of discordance (e.g., degree of discordance) can be omitted. However, when selecting this procedure, although calculation of the degree of discordance can be omitted, drawbacks exist in that the registration amount and comparison time both increase. An example of the process relating to the registration procedure is shown by procedure RVR. An example of the processing relating to the comparison procedure is shown by procedure RVM. ( Procedure RVR)

Step RVR1

The registration process is performed on a fingerprint for registration, and the registration information therein is registered.

Step RVR2

At the time of binary conversion of the registered fingerprint, the black and white pixels are reversed, following which the registration process is performed on this binary image (referred to as "reverse binary registered image"), and the reverse registered information of the above registered fingerprint is then registered.

(End of procedure RVR)

(Procedure RVM)

Step RVM1

A test fingerprint and registered fingerprint are compared using a comparison process. At this point, the check of the degree of discordance is omitted.

Step RVM2

The white and black pixels are reversed when performing binary conversion of a test fingerprint, and this binary image (referred to as "reverse binary test image") is then compared with the reverse registered information of a registered fingerprint by means of a comparison process. At this point, the check of the degree of discordance is omitted.

(End of procedure RVM)

Figure 20A:
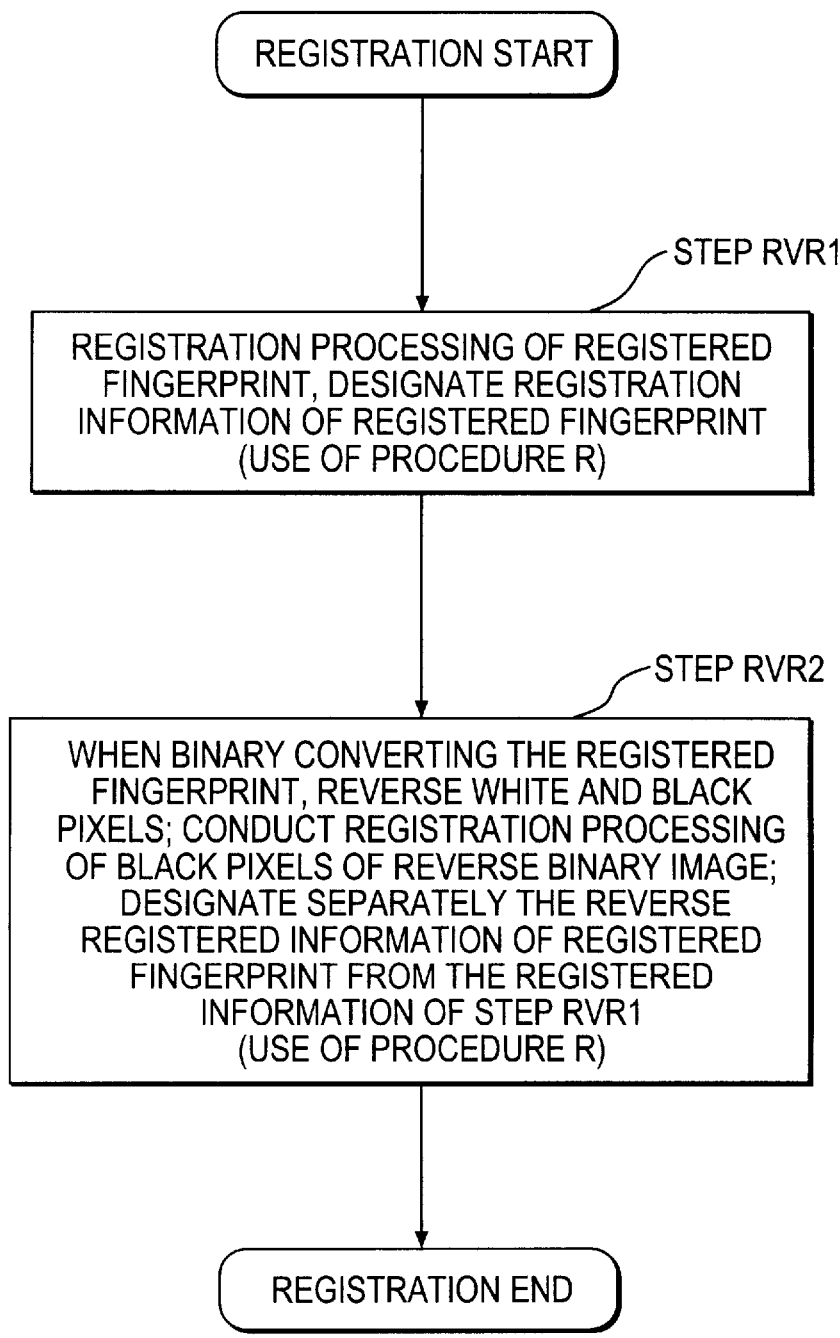
FIG. 20A is a flowchart of the registration process when using a white/black reversed image.
Figure 20B:
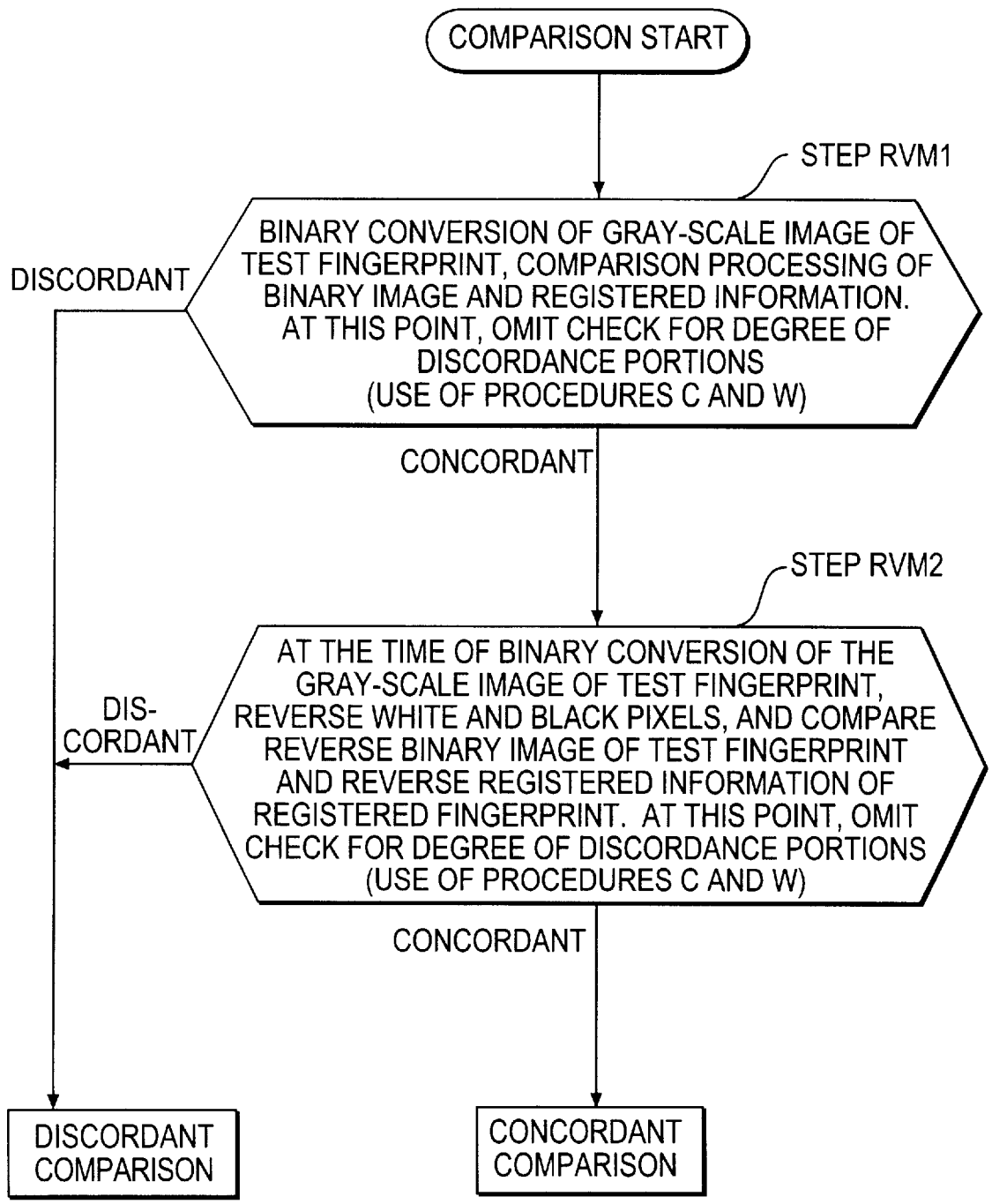
FIG. 20B is a flowchart of the comparison process when using a white/black reversed image.

FIG. 20A is a flow diagram showing an example of the process relating to the registration procedure; FIG. 20B is a flow diagram showing an example of the process relating to the comparison procedure.

(17) Expansions and Modifications

The present invention is not limited to the aforementioned embodiments, as it is possible to apply, for example, the following expansions and modifications. The methods of calculating the degree of concordance and degree of discordance in the image input method, smoothing process, binary conversion process, background segregation process, correction process, process for calculating an approximate center point, thinning or narrowing process, and comparison process are not limited to the descriptions contained in the embodiments and claims of the present invention, as modifications, expansions and/or partial omissions utilizing other methods (e.g., conventional methods) may also be employed. The method of designating the X and Y-coordinates is similarly optional. In alignment, when the drift in the rotation is small enough to be ignored, it is possible to check only those potential positional errors in parallel displacement, and to judge the maximum degree of concordance from this degree of concordance.

In step W2 of procedure W, when the conversion which carries out rotational and parallel displacement is performed, the expression for obtaining $X_{R@}$ and $Y_{R@}$ may be utilized. However, this is not limit to the embodiments of the present invention in any manner. For example, it is also possible to utilize the following:

$X_{R@}=X_R\cdot\cos(S)+Y_R\cdot\sin(S)$
$Y_{R@}=-X_R\cdot\sin(S)+Y_R\cdot\cos(S)$ Furthermore, the utilization of coordinate conversion or geometric transformation is similarly not limited to the aforementioned. The processing quantity necessary for comparison can be reduced due to the addition of a value for carrying out rotational and parallel displacement of the sub-template as registered information (in this case, the memory quantity increases).

In the embodiments of the invention of the present invention, the case in which the image is a fingerprint is disclosed, however, the present invention can be appropriately applied to any image which is constructed from lines. The classification of the sub-template and non-sub-template is not limited, and expansions such as classifying neither or setting many classifications are also possible. In addition, it is also possible to individually select one or more of the aforementioned processes and respectively apply them to an optional image processing apparatus.

Results of the Invention

In the present invention, the capabilities of an image processing apparatus in the recognition of a fingerprint or image similar to a fingerprint can be improved by means of selecting and applying at least one of the means and/or processes described in the aforementioned embodiments. The main results of the present invention are summarized below.

(1) In the comparison of registered information and a test image, during the binary conversion process, the fluctuation of the inputted gray-scale image is offset by means of standardizing the ratio of black pixels of the test image to a specified range, and hence the precision of the comparison judgment can be increased. In addition, by means of appropriately setting the specified range of the black pixel ratio, degree of concordance and degree of discordance, the recognition error rate (i.e., the probability of mistaking another individual's fingerprint as the fingerprint of the person in question, or vice versa) can also be reduced.

(2) At the time of binary conversion following division of the image into a plurality of partial regions, the discontinuity of the binary image generated at the boundaries of the partial regions can be reduced by means of modifying the average brightness value of the partial regions using the reciprocal relationship of the partial regions, and by performing binary conversion using this modified average brightness value.

At the time of binary conversion following division of the image into a plurality of partial regions, within a partial region, by means of binary converting a partial region possessing an average brightness value within a first specified range and a brightness modification amount within a second specified range using a threshold value determined with regard to all regions of the image, the noise effects of an image, generated upon using the image input unit, to the binary image following binary conversion can be reduced during binary conversion of a minute variable portion of the brightness.

In the binary conversion in which the binary conversion process is repeated to standardize the ratio of black pixels following modification of the brightness threshold value for binary conversion, with regard to nonuniformity and fluctuation of the brightness of the input image, it is possible for the ratio of black pixels to approach the threshold value which results in the ability to clearly define fingerprint lines, as well as reduce the fluctuation of the line widths.

(3) By dividing a displacement interval of at least one direction into a plurality of partial intervals to form partial alignment intervals over a displacement range in which alignment comparison occurs, the processing amount for comparison can be significantly reduced when a final judgment of concordance results during sequential comparison of the partial alignment intervals, since the comparison process need is not conducted on the remaining partial alignment intervals following the interval in which a judgment of concordance of both images was rendered.

In addition, the processing amount for comparison can be further reduced since in the aforementioned partial alignment intervals (1, 2, ..., n), when a maximum value of the degree of concordance falls outside of a specified range, a judgment of discordance is rendered without processing the remaining partial alignment intervals.

(4) In the case where a random address A in the memory of the registered image is a black pixel, and the address A in the memory of a test image is a white pixel, when a predetermined number of neighboring addresses of address A of the test image are searched and a black pixel exists, the black pixel of address A of the test image is judged to be concordant with the black pixel of address A of the registered image; and in subsequent comparison of the above registered image and test image judgments regarding the concordance of black pixels from other addresses of the registered image which overlap black pixel of address A of the test image. Therefore the fluctuation in the distortion of the lines of an image can be effectively countered by checking the neighboring information of a black pixel of a registered image in the above-described manner.

(5) In the case where an optional check of the portions corresponding to sweat glands of a finger is selected, during comparison processing of the registered image and test image, when a hole is detected in the test image, all registered holes are examined for concordance with this hole, and when the number of concordant registered holes exceeds a predetermined ratio, a judgment of concordance is rendered with regard to the registered image and test image. As a result, an extremely strict comparison can be performed.

(6) In the case when, upon comparing a test image and registered information, as well as a reverse test image (in which the brightness of the original test image is reversed) and reverse registered information, both of these comparisons produce successful results, a judgment of concordance is rendered with regard to the registered image and test image. As a result, calculation of the degree of discordance can be omitted.

I claim:

1. An image processing apparatus having stored registered images, comprising:

means for determining whether a ratio of a total number of black pixels to a total number of black pixels and white pixels in an original test image is within a first predetermined range;

binary converting and fixing means for converting the original test image into a binary test image and for fixing said binary test image for comparison, said binary converting and fixing means reconverting and refixing until said original test image has said ratio within the first predetermined range;

memory means for storing said binary test image having said ratio within said first predetermined range and a binary converted one of said stored registered images, said one of said stored registered images being converted and fixed in the same manner as said test image;

means for aligning said binary test image with said binary registered image to compare said two binary images; and means for comparing said two binary images to determine whether said binary test image is the same as said binary registered image, said binary test image having said ratio within said first predetermined range being used for comparison with said binary registered image by said comparing means.

2. An image processing apparatus according to claim 1, further comprising means for thinning said binary test image, the thinning being a narrowing of the width of black pixels of said binary test image so that a majority of the width of a black line in said original test image occupies a whole width of a black pixel, and said binary test image after thinning is used for comparison with said binary registered image.

3. An image processing apparatus according to claim 1, wherein the means for aligning said binary test image with said binary registered image includes means for moving at least one of the two binary images in one or more intervals in order to compare said two binary images, wherein each said one or more intervals is divided into a plurality of partial intervals, means for judging whether said binary test image satisfies a predetermined condition of concordance with said binary registered image in one of said partial intervals, means for successively displacing said one partial interval until said predetermined condition of concordance is satisfied, and means for judging said binary test image as originating from a same object as said binary registered image when said predetermined condition of concordance is satisfied.

4. An image processing apparatus according to claim 1, wherein the aligning means comprises:

means for converting, fixing, and thinning the one stored registered image into a thinned binary registered image; and wherein the comparing means comprises:

means for judging whether a concordance between said binary test image and said thinned binary registered image satisfies a predetermined condition of a degree of concordance; and means for judging whether said binary test image originates from a same object as said thinned binary registered image according to said degree of concordance and a degree of discordance in order to minimize recognition error.

5. An image processing apparatus according to claim 1, wherein the means for aligning said binary test image with said binary registered image includes:
   means for moving at least one of the two binary images in one or more intervals in order to compare said two binary images, wherein each said one or more intervals is divided into a plurality of N partial intervals, and
   means for judging whether said binary test image satisfies a predetermined condition of concordance with said binary registered image in one of said N partial intervals;
   means for successively displacing said N partial intervals of an m-th (m is a positive number) order of said partial intervals;
   means for judging that said binary test image originates from a same object as said binary registered image when said predetermined condition of concordance is satisfied prior to the m-th order of successive displacement; and
   means for judging that said binary test image originates from a different object than said binary registered image when said predetermined condition of concordance is not satisfied until a successive displacement of the m-th order of said partial intervals, so as to carry out rapid comparison by said comparing means.

6. An image processing apparatus according to claim 1, wherein said means for comparing comprises:
   means for judging concordance of a black pixel of said binary test image with a black pixel of said binary registered image, and
   means for comparing pixels of said binary test image with pixels of said binary registered image, binary information of a pixel of said binary test image being concordant with binary information of a pixel of said binary registered image at a corresponding address when the binary information of each of said two pixels is equal to each other, or when the binary information of at least one of neighboring pixels around said binary test image is equal to said pixel of said binary registered image.

7. An image processing apparatus according to claim 1, further comprising:
   means for obtaining a reverse image of said original test image and said stored registered image;
   means for converting said reverse test image and said reverse registered image into a binary reversed test image and a binary reversed registered image, respectively, so that a ratio of black pixels to total pixels lies within the first predetermined range;
   memory means for storing address information of black pixels of said binary reversed test image and said binary reversed registered image;
   means for comparing said binary registered image with said binary test image for evaluating a first degree of concordance;
   means for comparing the binary reversed test image with said binary reversed registered image to evaluate a second degree of concordance; and
   means for determining that the original test image and said stored registered image originate from the same object if both said first and second degrees of concordance evaluation satisfy respective predetermined ranges.

8. An image processing apparatus having stored registered images, comprising:
   means for determining whether a ratio of a total number of black pixels to a total number of black pixels and white pixels in an original test image is within a first predetermined range;
   binary converting and fixing means for converting the original test image into a binary test image and for fixing said binary test image for comparison, said binary converting and fixing means reconverting and refixing until said original test image has said ratio within the first predetermined range, said binary converting and fixing means including
      means for dividing said original test image into a plurality of partial regions,
      means for obtaining an average brightness for each of the plurality of partial regions,
      means for determining a threshold brightness value for each of the plurality of partial regions and for converting said original test image into a binary test image with reference to the threshold brightness value of each said partial region and regions neighboring each said partial region, and
      means for obtaining the ratio of the total number of black pixels to the total number of black and white pixels, and for repeating said binary conversion of said original test image to a binary test image to change said threshold brightness value until said ratio of the total number of black pixels to the total number of black and white pixels is within the first predetermined range, the binary test image obtained after the repeated conversion being used for comparison with said binary registered image;
   memory means for storing said binary test image having said ratio within said first predetermined range and a binary converted one of said stored registered images, said one of said stored registered images being converted and fixed in the same manner as said test image;
   means for aligning said binary test image with said binary registered image to compare said two binary images; and
   means for comparing said two binary images to determine whether said binary test image is the same as said binary registered image, said binary test image having said ratio within said first predetermined range being used for comparison with said binary registered image by said comparing means.

9. An image processing apparatus according to claim 8, wherein said memory means includes means for storing address information of said black pixels, including address information of representative black pixels in one of said partial regions,
   wherein said address information includes an address of a black pixel, a bit to classify each pixel as black or white, and format identification data representing identification data of said partial regions, in order to minimize binary image storage volume in said memory means.

10. An image processing apparatus having stored registered images, comprising:
   means for determining whether a ratio of a total number of black pixels to a total number of black pixels and white pixels in an original test image is within a first predetermined range;
   binary converting and fixing means for converting the original test image into a binary test image and for fixing said binary test image for comparison, said binary converting and fixing means reconverting and refixing until said original test image has said ratio within the first predetermined range;

memory means for storing said binary test image having said ratio within said first predetermined range and a binary converted one of said stored registered images, said one of said stored registered images being converted and fixed in the same manner as said test image;

means for aligning said binary test image with said binary registered image to compare said two binary images;

means for discovering holes in said binary registered image; and means for comparing said two binary images to determine whether said binary test image is the same as said binary registered image, said comparing means judging concordance of said binary test image and said binary registered image when both an address of a hole in said binary registered image and an address of a hole in the binary test image satisfy a predetermined relationship.

* * * * *